US008531651B2

(12) United States Patent
Sato et al.

(10) Patent No.: US 8,531,651 B2
(45) Date of Patent: Sep. 10, 2013

(54) DISTANCE MEASURING DEVICE, DISTANCE MEASURING METHOD, PROGRAM, AND INTEGRATED CIRCUIT

(75) Inventors: Daisuke Sato, Osaka (JP); Tatsumi Watanabe, Osaka (JP); Bunpei Toji, Gifu (JP); Yasuhiro Kuwahara, Osaka (JP); Takeshi Ito, Osaka (JP); Shinya Kiuchi, Osaka (JP); Yoshiaki Owaki, Osaka (JP)

(73) Assignee: Panasonic Corporation, Osaka (JP)

( * ) Notice: Subject to any disclaimer, the term of this patent is extended or adjusted under 35 U.S.C. 154(b) by 437 days.

(21) Appl. No.: 12/990,677

(22) PCT Filed: Feb. 18, 2010

(86) PCT No.: PCT/JP2010/001023
§ 371 (c)(1),
(2), (4) Date: Nov. 2, 2010

(87) PCT Pub. No.: WO2010/100846
PCT Pub. Date: Sep. 10, 2010

(65) Prior Publication Data
US 2011/0051118 A1  Mar. 3, 2011

(30) Foreign Application Priority Data
Mar. 5, 2009  (JP) ................................ 2009-052669

(51) Int. Cl.
*G01C 3/08* (2006.01)
(52) U.S. Cl.
USPC .......... 356/4.07; 356/4.01; 356/4.1; 356/5.01

(58) Field of Classification Search
USPC .............................................. 356/3.01–5.15
See application file for complete search history.

(56) References Cited

U.S. PATENT DOCUMENTS

| 5,646,396 A | 7/1997 | Richard |
| 5,877,493 A | 3/1999 | Richard |

(Continued)

FOREIGN PATENT DOCUMENTS

| CN | 1880970 | 12/2006 |
| JP | 58-66880 | 4/1983 |

(Continued)

OTHER PUBLICATIONS

International Search Report issued Mar. 16, 2010 in International (PCT) Application No. PCT/JP2010/001023.

(Continued)

*Primary Examiner* — Luke Ratcliffe
(74) *Attorney, Agent, or Firm* — Wenderoth, Lind & Ponack, L.L.P.

(57) ABSTRACT

A distance measuring device using a multiple wave enables measurement of long distances with a high resolution and with a high precision by significantly reducing the circuit scale required for demultiplexing circuitry. A distance measuring device (1) includes an illumination unit (1) that illuminates using multiple modulated light having a plurality of frequencies satisfying a relationship in which one frequency is an even multiple of another frequency, a light receiving unit (20) that accumulates the charge of reflected light of the multiple modulated light into a plurality of accumulation units while switching an accumulation unit into which the charge is accumulated at a predetermined timing, and a distance calculation unit (30) that calculates a distance based on the charge.

19 Claims, 6 Drawing Sheets

(56) References Cited

U.S. PATENT DOCUMENTS

| | | | |
|---|---|---|---|
| 5,889,278 A | 3/1999 | Richard | |
| 6,100,540 A * | 8/2000 | Ducharme et al. | 250/559.38 |
| 6,876,441 B2 * | 4/2005 | Barker | 356/5.09 |
| 7,016,519 B1 | 3/2006 | Nakamura et al. | |
| 7,119,350 B2 | 10/2006 | Hashimoto et al. | |
| 7,177,014 B2 * | 2/2007 | Mori et al. | 356/5.09 |
| 7,336,346 B2 * | 2/2008 | Aoki et al. | 356/5.1 |
| 7,486,804 B2 | 2/2009 | Nakamura et al. | |
| 2005/0145773 A1 | 7/2005 | Hashimoto et al. | |
| 2006/0120595 A1 | 6/2006 | Nakamura et al. | |
| 2006/0285102 A1 | 12/2006 | Aoki et al. | |
| 2007/0057209 A1 | 3/2007 | Kurihara et al. | |
| 2007/0097349 A1 | 5/2007 | Wada et al. | |

FOREIGN PATENT DOCUMENTS

| | | |
|---|---|---|
| JP | 5-264723 | 10/1993 |
| JP | 10-9834 | 1/1998 |
| JP | 11-160065 | 6/1999 |
| JP | 11-507155 | 6/1999 |
| JP | 2004-32682 | 1/2004 |
| JP | 2006-84430 | 3/2006 |
| JP | 3840341 | 8/2006 |
| JP | 3906858 | 1/2007 |
| JP | 2007-121116 | 5/2007 |
| JP | 2007-132848 | 5/2007 |
| JP | 2008-107286 | 5/2008 |

OTHER PUBLICATIONS

Chinese Office Action issued Nov. 29, 2012 in Application No. 201080001501.1.

* cited by examiner

DISTANCE MEASURING DEVICE, DISTANCE MEASURING METHOD, PROGRAM, AND INTEGRATED CIRCUIT

TECHNICAL FIELD

The present invention relates to a distance measuring device, a distance measuring method, a program, and an integrated circuit. In particular, the present invention relates to a distance measuring device, a distance measuring method, a program, and an integrated circuit for performing distance measurement using a multiple wave.

BACKGROUND ART

Distance measuring devices that have been developed in recent years (distance measuring devices using a range image sensor) illuminate an object with an electromagnetic wave having a predetermined frequency and measure the distance to the object based on a reflected wave from the object, and form a range image using pixel values representing the measured distance (such an image is referred to as a "range image"). Some of such distance measuring devices use a plurality of cameras or perform laser scanning, whereas some others use the time-of-flight (TOF). Distance measuring devices using the TOF (see, for example, Patent Citations 1 to 3) are compact and achieve relatively high precision.

With the TOF technique, a target space for distance measurement is illuminated with intensity-modulated light, and a phase difference of the reflected wave is detected to measure the distance. The intensity-modulated light used in the TOF distance measurement may be, for example, a sine wave, a triangular wave, or a pulsed wave. The basic principle of the TOF technique is the same irrespective of which kind of light is used as the intensity-modulated light.

FIG. 1 is a diagram describing the principle of the TOF technique. A phase difference $\Delta\psi$ between the intensity-modulated light used to illuminate the measurement-target space and the reflected wave (reflected light) of the illuminating light is calculated using the formula below:

$$\Delta\psi = \tan^{-1}\left(\frac{A_2 - A_0}{A_1 - A_3}\right) \qquad \text{Formula 1}$$

where T is the modulation cycle of the intensity of the intensity-modulated light, $\omega$ is the angular frequency, and A0, A1, A2, and A3 are the intensities of the reflected wave at timings 0, T/4, T/2, and 3 T/4, respectively.

Based on this, the distance L is calculated using the formula below:

$$L = c\frac{\Delta t}{2} = \frac{c\Delta\psi}{2\omega} \qquad \text{Formula 2}$$

where c is the speed of light, and $\Delta t$ is the round-trip time of the light, which is written as $\Delta t = \Delta\psi/\omega$.

However, the TOF distance measurement has a tradeoff between the precision of the distance (the precision of the distance measurement) and the detectable maximum distance. More specifically, the precision of the distance is directly proportional to the modulation frequency of the intensity-modulated light used for distance measurement, whereas the detectable maximum distance is inversely proportional to the modulation frequency of the intensity-modulated light. As the intensity-modulated light with a higher modulation frequency is used for distance measurement, the precision of the distance will increase but the detectable maximum distance will decrease. In other words, the detectable distance will increase but the distance precision will decrease as the intensity-modulated light with a lower modulation frequency is used for distance measurement.

The TOF distance measuring method has this tradeoff because the TOF method fails to detect a phase difference corresponding to or exceeding one modulation cycle of the intensity-modified light used for distance measurement.

Techniques that overcome this disadvantage are described in Patent Citations 4 and 5. To enable a phase difference corresponding to or exceeding one cycle to be detectable, the techniques use multiple-frequency modulated light (intensity-modulated light generated by superimposing (multiplexing) a plurality of light elements having intensities modulated at a plurality of different frequencies, or intensity-modulated light that has been intensity-modulated using a modulation signal generated by superimposing a plurality of frequency elements). A method (technique) for detecting a phase difference corresponding to or exceeding one cycle using the multiple-frequency modulated light will be hereafter referred to as a "multiple-wave TOF technique". With the multiple-wave TOF technique, the distance to be measured is first determined roughly (with a low precision) using low-frequency intensity-modulated light, or a light element that has been intensity-modulated at a low frequency, and then the distance is measured precisely (with a high precision) using high-frequency intensity-modulated light, or a light element that has been modulated at a high frequency. The multiple-wave TOF technique enables the distance to be measured at a precision corresponding to a high frequency (to be performed at a high precision) even when a reflected wave of the high-frequency element (the light element that has been intensity-modulated at a high frequency) from the object in the multiple-frequency modulated light has a phase difference (a high-frequency phase difference) corresponding to or exceeding one cycle of the high frequency. In this manner, the multiple-wave TOF technique solves the above tradeoff problem, and improves the precision of the distance measurement and also lengthens the detectable distance.

Another method described in Patent Citation 6 uses low-frequency light (light that has been intensity-modulated at a low frequency) and high-frequency light (light that has been intensity-modulated at a high frequency) alternately, instead of using a multiple wave (multiple-frequency modulated light). This distance measuring method has a lower distance precision than the above method that uses a multiple wave.

Citation List

Patent Literature

Patent Citation 1: Japanese Patent No. 3906858
Patent Citation 2: Japanese Patent No. 3840341
Patent Citation 3: Japanese Unexamined Patent Publication No. 2007-121116
Patent Citation 4: Japanese Unexamined Patent Publication No. S58-66880
Patent Citation 5: Japanese Unexamined Patent Publication No. H5-264723
Patent Citation 6: Japanese Unexamined Patent Publication No. H11-160065

SUMMARY

Technical Problem

However, the distance measuring device using the multiple wave TOF technique is required to include circuits (for example, filter circuits and synchronous detection circuits) for demultiplexing (frequency separation). As a result, the distance measuring device will have a larger circuit scale (hardware scale). More specifically, the distance measurement device using the multiple wave TOF technique is required to include demultiplexing circuits corresponding in one-to-one to pixels. This will increase the pitch of pixels, and consequently lower the resolution. While typical distance measuring devices use a wave having a single frequency (a single wave), distance measuring devices using a multiple wave are difficult to manufacture at a low cost as well as without increasing the circuit scale.

To solve the above problems, it is an object of the present invention to provide a distance measuring device that enables distance measurement using a multiple wave to be performed with a higher resolution of the resulting range image, a higher precision of the distance measurement, and a longer measurable distance by significantly reducing the scale of its demultiplexing circuitry as well as minimizing a decrease in the resolution of the resulting range image.

Solution to Problem

A first aspect of the present invention provides a distance measuring device including an illumination unit, a light receiving unit, a distribution unit, an accumulation unit, and a distance calculation unit.

The illumination unit illuminates a target for distance measurement with multiple modulated light that is intensity-modulated using a multiplex modulation signal generated by multiplexing N different frequencies $f_n$ (N is an integer equal to or greater than 2) ($1 \leq n \leq N$). The frequencies $f_n$ satisfy a relationship in which $f_{n+1} = 2 k_n * f_n$ (n and $k_n$ are natural numbers). The light receiving unit receives reflected light of the illuminating multiple modulated light from the distance measurement target, and obtains charge corresponding to an amount of the received light. The distribution unit outputs the charge obtained by the light receiving unit to a predetermined output destination at a predetermined timing. The accumulation unit accumulates the charge output from the distribution unit. The distance calculation unit calculates a distance to the distance measurement target based on an amount of charge accumulated by the accumulation unit.

This distance measuring device measures distances using multiple modulated light generated by multiplexing at least two different frequencies satisfying a relationship in which one frequency is an even multiple of another frequency (relationship expressed by the above formula). This structure enables the reflected light to be demultiplexed easily (the multiplexed frequency elements to be extracted easily from the reflected light) by simply requiring the distribution unit to execute distribution control at a predetermined timing. As a result, the distance measuring device can have a smaller pixel pitch, and improves the resolution of the resulting range image.

More specifically, the distance measuring device, which uses the light generated by multiplexing a plurality of frequencies satisfying the relationship in which one frequency is an even multiple of another frequency, enables the light to be demultiplexed simply through the distribution control. In typical TOF distance measurement, the frequency values are subtracted in every half cycle as expressed by Formula 1. The frequencies have the same values after every half cycle when the frequencies have the relationship in which one frequency is an even multiple of another frequency. The frequency elements having the same values can therefore be canceled out by such subtraction. This enables the above demultiplexing.

In this manner, the distance measuring device enables the light to be demultiplexed simply using addition and subtraction, and significantly reduces the circuit scale required for demultiplexing circuitry. As a result, the distance measuring device enables distance measurement using multiple modulated light to be performed with a higher precision and a longer measurable distance.

The distance measuring device may be, for example, a distance measuring instrument using a light wave and a range image sensor. To obtain a range image, the distance measuring device is only required to include as many light receiving elements, distribution units, first accumulation units, and second accumulation units as pixels. In this case, it is only required that the demultiplexing process be performed in units of pixels by the light receiving units, the distribution units, the first accumulation units, and the second accumulation units, and the distance calculation be performed in units of pixels by the distance calculation unit. The calculation performed by the distance calculation unit is relatively complex, and thus may be performed after the charge read from the first accumulation units and the second accumulation units is serialized.

The illumination unit may be formed by, for example, an LED light source or a laser light source. The illumination unit may further include an intensity modulation signal generation unit for generating an intensity modulation signal, which is used to generate the illuminating intensity-modulated light. It is preferable to use invisible light, such as infrared light, as the illuminating light because the use of invisible light removes discomfort when, for example, the object is a person. The multiple modulated light illuminated from the illumination unit is an electromagnetic wave. The multiple modulated light may be an electromagnetic wave having a frequency outside the infrared light range or the visible light range, or alternatively may be a sonic wave (such as an ultrasonic wave).

The intensity modulation should not be limited to intensity modulation performed using a sine wave, but may be intensity modulation performed using a cyclic signal, such as a triangular wave or a pulsed wave. Only the axial resolving power at short and long distances changes depending on which kind of signal is used. The signal with which the intensity modulation is to be performed should be selected according to the purpose or usage of the distance measurement.

The distance measurement target typically refers to a single point on a measurement target object for a distance measuring instrument using a light wave. For a range image sensor, however, it refers to the entire space that is imaged by an image sensor (hereafter may be referred to as a target space).

The light receiving unit may be formed by, for example, an image sensor (a charge-coupled device (CCD) image sensor or a complementary metal oxide semiconductor (CMOS) image sensor).

The light receiving unit may include an optical filter selected according to an electromagnetic wave illuminated from the illumination unit. When, for example, infrared light is illuminated from the illumination unit, the light receiving unit may include an optical filter for infrared light that cuts electromagnetic waves other than infrared light. This prevents the electromagnetic waves other than the infrared light element from entering the light receiving elements of the light receiving unit.

The accumulation unit includes an accumulation element (a charge accumulation element). The accumulation element may be formed by, for example, a capacitor or a depleted layer (a potential well) of a semiconductor. The accumulation element should not be limited to these, and may be formed by any material that can hold charge.

The accumulation unit may include a plurality of accumulation elements (charge accumulation elements).

The predetermined timing may be timings t=0, Tn/4, Tn/2, and 3 Tn/4 when, for example, each frequency element included in the multiple modulated light has a cycle Tn. This is a mere example. There are basically three unknown parameters ($\Delta\psi$, A, and B, which will be described later). In this case, the predetermined timing may be set at any timings at which at least three sampled values can be obtained using reflected light (reflected wave).

The switching refers to, for example, executing the distribution control.

The distance calculation unit performs phase difference calculation and distance calculation. Also, the nonlinear conversion may be performed using, for example, a lookup table (LUT). Only the distance calculation unit may be implemented by software processing.

A second aspect of the present invention provides the distance measuring device of the first aspect of the present invention in which the accumulation unit includes at least one accumulation element for each frequency $f_n$ included in the multiple modulated light ($1 \leq n \leq N$).

The distance measuring device includes the accumulation elements each of which independently stores the amount of charge corresponding to a different frequency element. Each of the accumulation elements arranged in one-to-one correspondence to the frequency elements stores the charge amount of its corresponding frequency element. This structure enables the distance calculation unit to calculate a phase difference of each frequency element.

When, for example, using a double wave (in which the higher frequency is k multiple of the lower frequency, where k is equal to or greater than 2), this distance measuring device is required to include twice as many accumulation elements as required in a distance measuring device that performs TOF distance measurement using a single wave. However, the distance measurement precision of this distance measuring device is k times (where k is equal to or greater than 2) higher than the precision of the distance measuring device using a single wave.

A third aspect of the present invention provides the distance measuring device of one of the first and second aspects of the present invention in which the distribution unit switches, for each frequency $f_n$ included in the multiple modulated light (where $1 \leq n \leq N$ and the frequency has a cycle $T_n$), the output destination at a predetermined timing t0, a predetermined timing t1 (t1≠t0), a predetermined timing t2 (t2=t0+$T_n$/2), and a predetermined timing t3 (t3=t1+$T_n$/2). The accumulation unit continuously accumulates charge for at least a longest cycle $T_1$ of the multiple modulated light.

This distance measuring device uses the light generated by multiplexing the plurality of frequencies having the relationship in which one frequency is an even multiple of another frequency. In this case, higher frequency elements exceeding each frequency $f_n$ will have the same values after every half cycle ($T_n$/2) of the high frequency elements and such frequency elements can be eliminated by subtraction. Also, the values of lower frequency elements below each frequency $f_n$ at each timing can be paired with the same values but with the inversed signs within the longest cycle $T_1$, and thus such frequency elements can also be eliminated by summation (described in detail later). More specifically, this structure enables demultiplexing to be performed easily only through the distribution control executed by the distribution unit. This significantly reduces the circuit scale required for demultiplexing circuitry, and enables distance measurement using multiplex modulated light to be performed with a high precision as well as over long distances.

The continuously accumulating charge for at least the longest cycle $T_1$ may include (1) continuously adding (summing), for the cycle $T_1$, sampled values of the accumulated charge amount at predetermined timings, or (2) continuously adding (summing), for the cycle $T_1$, sampled values of the accumulated charge amount obtained in a predetermined summation period that includes predetermined timings.

A fourth aspect of the present invention provides the distance measuring device of the third aspect of the present invention in which the accumulation unit accumulates a charge amount corresponding to a difference between a charge amount at the timing t0 and a charge amount at the timing t2 for at least the longest cycle $T_1$ (a signal obtained (generated) through the accumulation is referred to as a first difference summation signal). After transferring the accumulated charge amount to the distance calculation unit, the accumulation unit accumulates a charge amount corresponding to a difference between a charge amount at the timing t1 and a charge amount at the timing t3 for at least the longest cycle $T_1$ (a signal obtained (generated) through the accumulation is referred to as a second difference summation signal).

To accumulate the difference charge amount (or to obtain the difference by subtraction), the charge may be accumulated in the accumulating element (such as a capacitor) with a current flowing in an inversed direction that is generated using, for example, a diode.

This distance measuring device accumulates the difference charge amount, and therefore enables only the intensity modulated light element to be accumulated for the longest cycle $T_1$ while cancelling out the steady-state element (such as outside light). This prevents saturation of the light receiving elements. This structure enables the target space to be illuminated more strongly with the intensity-modulated light, and improves the precision of the distance measurement.

This distance measuring device uses a single accumulation element for each frequency. In this case, the distance measuring device discards the second difference summation signal element while the first difference summation signal is being accumulated (or vise versa). However, when the resolution is more important, this structure is preferable because this structure minimizes an increase in the circuit scale caused by an increasing number of accumulation elements.

A fifth aspect of the present invention provides the distance measuring device of the third aspect of the present invention in which the accumulation unit includes a first accumulation unit and a second accumulation unit. The first accumulation unit accumulates the charge amount corresponding to the difference between the charge amount at the timing t0 and the charge amount at the timing t2 for at least the longest cycle $T_1$ (the first difference summation signal). The second accumulation unit accumulates the charge amount corresponding to the difference between the charge amount at the timing t1 and the charge amount at the timing t3 for at least the longest cycle $T_1$ (the second difference summation signal).

This distance measuring device uses two accumulation elements (the first accumulation unit and the second accumulation unit). Although this increases the circuit scale of the device, this also enables the distance measuring device to hold the first and second difference summation signals simultaneously. In this case, the first and second difference summation signals have no time delay between them. This structure reduces blurring that may occur when an object is moved, and enables the resulting range image to have a high precision. Also, although this distance measuring device doubles the number of accumulation elements, the device maintains the other circuitry to be usable commonly. The use of the doubled accumulation elements does not double the entire circuit scale of the distance measuring device, and maintains the entire circuit scale to be smaller than the doubled circuit scale.

A sixth aspect of the present invention provides the distance measuring device of one of the fourth and fifth aspects of the present invention in which the accumulation unit accumulates, as the first difference summation signal, charge corresponding to the formula below:

$$A_2^{(n)} - A_0^{(n)} = \sum_{j=0}^{k_n-1} \left( f\left(jT_n + \frac{T_n}{2}\right) - f(jT_n) \right),$$

and the accumulation unit accumulates, as the second difference summation signal, charge corresponding to the formula below:

$$A_2^{(n)} - A_0^{(n)} = \sum_{j=0}^{k_n-1} \left( f\left(jT_n + \frac{T_n}{2}\right) - f(jT_n) \right),$$

where f(t) is the reflected light of the multiple modulated light from the distance measurement target, $T_n$ is a cycle of an n-th frequency element included in the multiple modulated light (n is a natural number and $1 \leq n \leq N$), and $k_n$ is the number of waves included in the longest cycle $T_1$ ($k_n = f_n/f_1$).

A seventh aspect of the present invention provides the distance measuring device of the third aspect of the present invention in which the accumulation unit transfers the charge amounts corresponding to the timings t0 to t3 to the distance calculation unit by sequentially performing, for an accumulated charge amount corresponding to the timing t0, an accumulated charge amount corresponding to the timing t1, an accumulated charge amount corresponding to the timing t2, and an accumulated charge amount corresponding to the timing t3 (the $0^{th}$ to third summation signals), processing of accumulating, at selected one of the timings t0 to t3, a charge amount corresponding to the selected timing for at least the longest cycle $T_1$ and transferring the accumulated charge amount to the distance calculation unit.

The processing performed sequentially for the accumulated charge amount corresponding to the timing t0, the accumulated charge amount corresponding to the timing t1, and the accumulated charge amount corresponding to the timing t2, and the accumulated charge amount corresponding to the timing t3 is performed in one of 4! orders. More specifically, the charge transfer processing may be performed in the order of E(t0), E(t1), E(t2), and E(t3), or in the order of E(t3), E(t2), E(t1), and E(t0) when E(t0) is the accumulated charge amount corresponding to the timing t0, E(t1) is the accumulated charge amount corresponding to the timing t1, E(t2) is the accumulated charge amount corresponding to the timing t2, and E(t3) is the accumulated charge amount corresponding to the timing t3. The transfer order may be one of the 4! orders, in any of which the charge transfer processing may be performed.

This distance measuring device eliminates the need for a circuit for inverting the current, and thus can have a smaller circuit scale, and improves the resolution of the resulting range image.

Also, this distance measuring device uses a single accumulation element for each frequency. In this case, the distance measuring device discards the other difference summation signal elements while each summation signal is being obtained. However, when the resolution is more important, this structure is preferable because this structure minimizes an increase in the circuit scale caused by an increasing number of accumulation elements.

An eighth aspect of the present invention provides the distance measuring device of the third aspect of the present invention in which the accumulation unit includes a first accumulation unit and a second accumulation unit. The first accumulation unit and the second accumulation unit transfer the charge amounts corresponding to the timings t0 to t3 (the $0^{th}$ to third summation signals) by accumulating charge amounts at selected two of the timings t0 to t3 for at least the longest cycle $T_1$, and then transferring the accumulated charge amounts to the distance calculation unit, and after transferring the accumulated charge amounts to the distance calculation unit, accumulating charge amounts corresponding to the remaining two of the timings for at least the longest cycle $T_1$, and then transferring the accumulated charge amounts to the distance calculation unit.

The selected two of the timings t0 to t3 may be, for example, the timings t0 and t2, and the remaining two timings may be, for example, the timings t1 and t3.

This distance measuring device uses two accumulation elements. Although this increases the circuit scale of the device, this also enables the distance measuring device to hold the two summation signals simultaneously. In this case, the two summation signals have no time delay between them. This structure reduces blurring that may occur when an object is moved, and enables the resulting range image to have a high precision. Also, although this distance measuring device doubles the number of accumulation elements, the device maintains the other circuitry to be usable commonly. The use of the doubled accumulation elements does not double the entire circuit scale of the distance measuring device, and maintains the entire circuit scale to be smaller than the doubled circuit scale.

A ninth aspect of the present invention provides the distance measuring device of the third aspect of the present invention in which the accumulation unit includes a $0^{th}$ accumulation unit, a first accumulation unit, a second accumulation unit, and a third accumulation unit. For at least the longest cycle $T_1$, the $0^{th}$ accumulation unit accumulates a charge amount at the timing t0 (a $0^{th}$ summation signal), the first accumulation unit accumulates a charge amount at the timing t1 (a first summation signal), the second accumulation unit accumulates a charge amount at the timing t2 (a second summation signal), and the third accumulation unit accumulates a charge amount at the timing t3 (a third summation signal).

This distance measuring device uses four accumulation elements. Although this increases the circuit scale of the device, this also enables the distance measurement device to hold the four summation signals simultaneously. In this case, the four summation signals have no time delay between them. This structure reduces blurring that may occur when an object is moved, and enables the resulting range image to have a high precision. Also, although this distance measuring device quadruplicates the number of accumulation elements, the device maintains the other circuitry to be usable commonly. The use of the quadruplicated accumulation elements does not quadruplicate the entire circuit scale of the distance measuring device, and maintains the entire circuit scale to be smaller than the quadruplicated circuit scale.

A tenth aspect of the present invention provides the distance measuring device of one of the seventh to ninth aspects of the present invention in which the accumulation unit accumulates, as the $0^{th}$ summation signal, charge corresponding to the formula below:

$$A_0^{(n)} = \sum_{j=0}^{k_n-1} f(jT_n),$$

the accumulation unit accumulates, as the first summation signal, charge corresponding to the formula below:

$$A_1^{(n)} = \sum_{j=0}^{k_n-1} f\left(jT_n + \frac{T_n}{4}\right),$$

the accumulation unit accumulates, as the second summation signal, charge corresponding to the formula below:

$$A_2^{(n)} = \sum_{j=0}^{k_n-1} f\left(jT_n + \frac{T_n}{2}\right),$$

and
the accumulation unit accumulates, as the third summation signal, charge corresponding to the formula below:

$$A_3^{(n)} = \sum_{j=0}^{k_n-1} f\left(jT_n + \frac{3T_n}{4}\right),$$

where f(t) is the reflected light of the multiple modulated light from the distance measurement target, $T_n$ is a cycle of an n-th frequency element included in the multiple modulated light (n is a natural number and $1 \leq n \leq N$), and $k_n$ is the number of waves included in the longest cycle $T_1$ ($k_n = f_n/f_1$).

An eleventh aspect of the present invention provides the distance measuring device of one of the first to tenth aspects of the present invention in which the distance calculation unit calculates a phase difference amount of each frequency included in the multiple modulated light, and calculates an ultimate phase difference amount based on, among the calculated phase difference amounts, a low-frequency phase difference amount that is a phase difference amount of selected one of the frequency elements included in the multiple modulated light, a high-frequency phase difference amount that is a phase difference amount of a higher frequency element than a frequency element corresponding to the low-frequency phase difference amount in the frequency elements included in the multiple modulated light, and calculates the distance based on the calculated ultimate phase difference amount.

This structure enables a high-frequency phase difference exceeding the lowest detectable phase difference ($\pi/2$) to be detected, and enables distance measurement to be performed with a high precision as well as over long distances.

A twelfth aspect of the present invention provides the distance measuring device of the eleventh aspect of the present invention in which the distance calculation unit calculates a phase difference amount $\Delta\psi_n$ of each frequency included in the multiple modulated light, the ultimate phase difference amount $\Delta\psi$, and the distance L based on the formulas below:

$$\Delta\psi_n = \tan^{-1}\left(\frac{A_2^{(n)} - A_0^{(n)}}{A_1^{(n)} - A_3^{(n)}}\right),$$

$$\Delta\psi = \left\lfloor \frac{f_j \Delta\psi_i}{f_i \pi} + 0.5 \right\rfloor \pi + \Delta\psi_j, \text{ and}$$

$$L = \frac{c\Delta\psi}{4\pi f_j},$$

where $\Delta\psi_i$ is the low-frequency phase difference amount of a frequency $f_i$, $\Delta\psi_j$ is the high-frequency phase difference amount of a frequency $f_j$, and c is a speed of light.

This distance measuring device calculates $$\frac{f_j}{f_i}\Delta\psi_i$$

in which the low-frequency phase difference amount $\Delta\psi i$ is converted to the high-frequency phase difference amount (enabling the distance measurement corresponding to a range exceeding $\pi/2$ although the precision is low). Combining the calculation result with the high-frequency phase difference amount $\Delta\psi j$ (only enabling the distance measurement corresponding to a range of $\pm\pi/2$ while the precision is high) will enable the ultimate phase difference amount $\Delta\psi$, which is the high-frequency phase difference amount equal to or above $\pi/2$ (enabling the distance measurement corresponding to a range exceeding $\pi/2$ while the precision to be high).

This structure enables distance measurement to be performed with a high precision as well as over long distances.

A thirteenth aspect of the present invention provides the distance measuring device of the twelfth aspect of the present invention in which the distance calculation unit calculates the phase difference amount $\Delta\psi_n$ of each frequency included in the multiple modulated light using the formula below:

$$\Delta\psi_n = \frac{\omega_n \tau}{2} + \tan^{-1}\left(\frac{A_2^{(n)} - A_0^{(n)}}{A_1^{(n)} - A_3^{(n)}}\right),$$

considering a charge accumulation time z at each of the timings.

As shown in FIG. 2 or 6, the distance measuring device calculates the phase difference amount $\Delta\psi$ considering the charge accumulating time $\tau(>0)$ at each timing. It is typically preferable to calculate the phase difference amount $\Delta\psi$ using an integral value instead of using an instantaneous value (sampled value) because the phase difference amount calculated using an integral value is less likely to be affected by noise. In this case, the formula for calculating the phase difference amount changes to the above formula.

When, for example, the summation period is a period from t=0 to t=$\tau$, t=T/4 to t=T/4+$\tau$, t=T/2 to t=T/2+$\tau$, and t=3 T/4 to t=3 T/4+$\tau$ as shown in FIG. 2, the phase difference amount $\Delta\psi$ is calculated using the formula below:

$$\Delta\psi = \frac{\omega\tau}{2} + \tan^{-1}\left(\frac{A_2 - A_0}{A_1 - A_3}\right). \quad \text{Formula 3}$$

The phase difference calculated using this formula differs by $\omega\tau/2$ from the phase difference calculated using a sampled value. This difference needs to be corrected.

The distance measuring device corrects a phase difference error caused by the charge accumulating time τ. In this case, the charge accumulating time t can be increased. This improves the precision further.

A fourteenth aspect of the present invention provides the distance measuring device of any one of the eleventh to thirteenth aspects of the present invention in which the distance calculation unit calculates a phase difference amount $\psi_{k-1}$ as the low-frequency phase difference amount when the phase difference amount $\psi_n$ of each frequency included in the multiple modulated light is arranged in an ascending order of numerical subscripts (n=1, 2, . . . ), and k is a numerical subscript used to identify a phase difference amount that first reaches π/2 or more (2≦k≦N).

For example, when $\psi_1=40°$, $\psi_2=80°$, and $\psi_3=120°$, the low-frequency phase difference is $\psi_2$ (=80°).

The phase difference amount calculated with the TOF technique is proportional to the frequency. In typical cases, when F(ω) is the Fourier transformation of f(t), the Fourier transformation of f(t−Δt) is written as F(ω)) e*p(−6ωΔt). As a result, the phase difference amount Δω is calculated as Δψ=ωΔt. In this manner, the phase difference amount is proportional to the frequency (a linear phase).

This distance measuring device uses, among the plurality of frequency elements included in the multiplex modulated light, the low-frequency element with which the highest precision can be obtained. This improves the precision of the distance measurement further. This distance measuring device forms a range image by performing the above processing for each pixel using the low-frequency element having the highest precision in accordance with the distance to a target object at each pixel, and therefore improves the distance precision of each image.

A fifteenth aspect of the present invention provides the distance measuring device of any one of the eleventh to fourteenth aspects of the present invention in which when an absolute value of the first difference summation signal is small or when an absolute value of a difference between the first summation signal and the third summation signal is small, the distance calculation unit uses, as the ultimate phase difference amount, the phase difference amount calculated using the formula below:

$$\Delta\psi = \frac{f_j}{f_i}\Delta\psi_i.$$

When the denominator is small and the quotient diverges in the formula below:

$$\Delta\psi_n = \tan^{-1}\left(\frac{A_2^{(n)} - A_0^{(n)}}{A_1^{(n)} - A_3^{(n)}}\right),$$

this distance measuring device calculates the distance using $$\frac{f_j}{f_i}\Delta\psi_i$$

into which the low-frequency phase difference ΔΨi is converted to a high-frequency phase difference amount (with which distance measuring corresponding to a range exceeding π/2 can be performed although the precision is low). In this manner, the distance measuring device avoids such cases in which distance measurement is impossible.

A sixteenth aspect of the present invention provides the distance measuring device of any one of the first to fifteenth aspects of the present invention in which the illumination unit generates the multiple modulated light in a manner that a lower-frequency element included in the multiple modulated light has a smaller amplitude.

The low-frequency element is used to measure the distance roughly. Thus, the low-frequency element may have a smaller amplitude. Setting the lower-frequency element with a smaller amplitude will reduce saturation occurring in the accumulation elements.

A seventeenth aspect of the present invention provides a distance measuring method used in a distance measuring device including an illumination unit, a light receiving unit, a distribution unit, and an accumulation unit. The distance measuring method includes a distribution control process and a distance calculation process.

The illumination unit illuminates a target for distance measurement with multiple modulated light that is intensity-modulated using a multiplex modulation signal generated by multiplexing N different frequencies $f_n$ (N is an integer equal to or greater than 2, and 1≦n≦N). The frequencies $f_n$ satisfy a relationship in which $f_{n+1}=2 k_n * f_n$ (n and $k_n$ are natural numbers). The light receiving unit receives reflected light of the illuminating multiple modulated light from the distance measurement target, and obtains charge corresponding to an amount of the received light. The distribution unit outputs the charge obtained by the light receiving unit to a predetermined output destination at a predetermined timing. The accumulation unit accumulates the charge output from the distribution unit.

In the distribution control process, an output destination of the distribution unit is controlled to switch to a predetermined output destination at a predetermined timing. In the distance calculation process, a distance to the distance measurement target is calculated based on an amount of charge accumulated by a first accumulation unit and a second accumulation unit.

The distance measuring method has the same advantageous effects as the distance measuring device of the first aspect of the present invention.

An eighteenth aspect of the present invention provides a program enabling a computer to implement a distance measuring method used in a distance measuring device including an illumination unit, a light receiving unit, a distribution unit, and an accumulation unit. The distance measuring method includes a distribution control process and a distance calculation process.

The illumination unit illuminates a target for distance measurement with multiple modulated light that is intensity-modulated using a multiplex modulation signal generated by multiplexing N different frequencies $f_n$ (N is an integer equal to or greater than 2, and 1≦n≦N). The frequencies $f_n$ satisfy a relationship in which $f_{n+1}=2k_n * f_n$ (n and $k_n$ are natural numbers). The light receiving unit receives reflected light of the illuminating multiple modulated light from the distance measurement target, and obtains charge corresponding to an amount of the received light. The distribution unit outputs the charge obtained by the light receiving unit to a predetermined output destination at a predetermined timing. The accumulation unit accumulates the charge output from the distribution unit.

In the distribution control process, an output destination of the distribution unit is controlled to switch to a predetermined output destination at a predetermined timing. In the distance calculation process, a distance to the distance measurement target is calculated based on an amount of charge accumulated by a first accumulation unit and a second accumulation unit.

The program enables the computer to implement the distance measuring method that has the same advantageous effects as the distance measuring device of the first aspect of the present invention.

A nineteenth aspect of the present invention provides an integrated circuit including an illumination unit, a light receiving unit, a distribution unit, an accumulation unit, and a distance calculation unit.

The illumination unit illuminates a target for distance measurement with multiple modulated light that is intensity-modulated using a multiplex modulation signal generated by multiplexing N different frequencies $f_n$ (N is an integer equal to or greater than 2, and $1 \leq n \leq N$). The frequencies $f_n$ satisfy a relationship in which $f_{n+1} = 2k_n * f_n$ (n and $k_n$ are natural numbers). The light receiving unit receives reflected light of the illuminating multiple modulated light from the distance measurement target, and obtains charge corresponding to an amount of the received light. The distribution unit outputs the charge obtained by the light receiving unit to a predetermined output destination at a predetermined timing. The accumulation unit accumulates the charge output from the distribution unit. The distance calculation unit calculates a distance to the distance measurement target based on an amount of charge accumulated by the accumulation unit.

The integrated circuit has the same advantageous effects as the distance measuring device of the first aspect of the present invention.

Advantageous Effects

The distance measuring device, the distance measurement method, the program, and the integrated circuit of the present invention enable distance measurement using a multiple wave to be performed with a higher resolution of the resulting range image, a higher precision of the distance measurement, and a longer measurable distance by significantly reducing the scale of its demultiplexing circuitry as well as minimizing a decrease in the resolution of the resulting range image.

Figure 1:
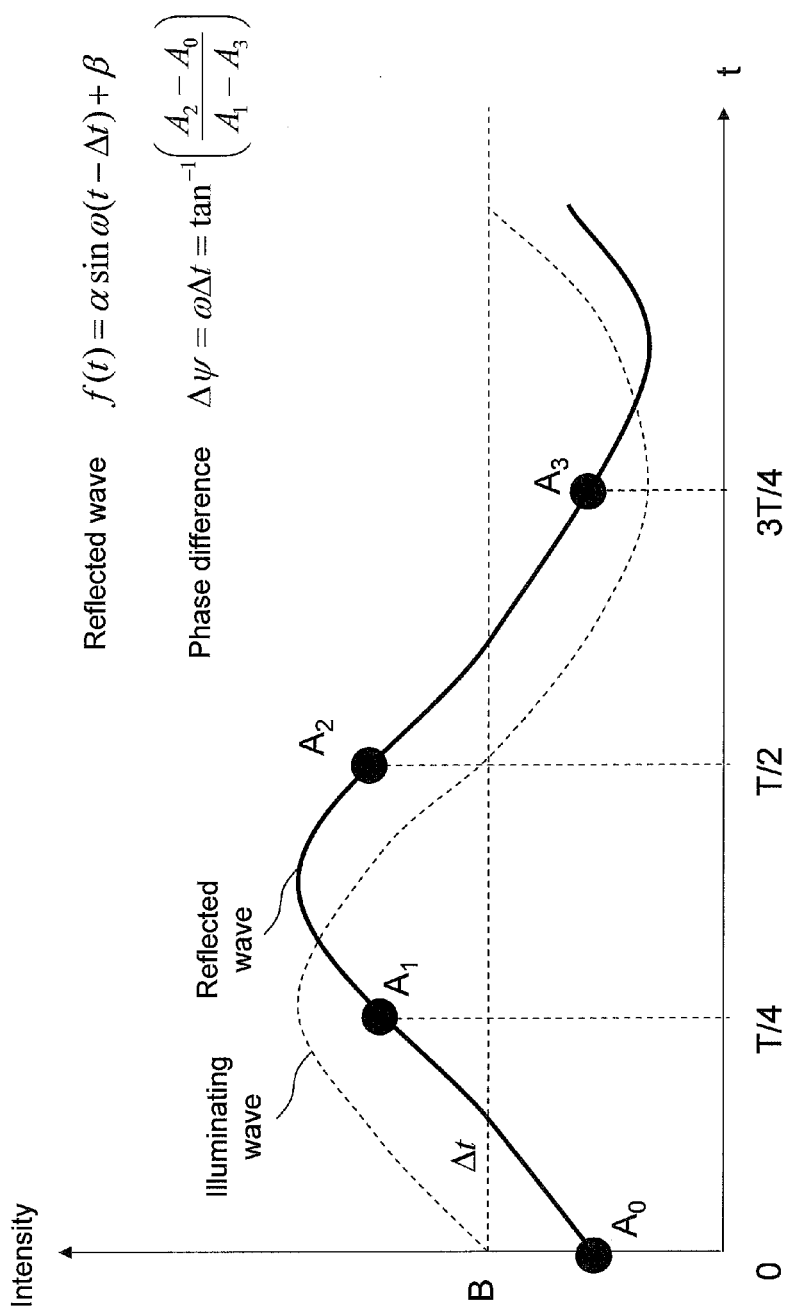
FIG. 1 is a schematic diagram describing the principle of TOF distance measurement.
Figure 2:
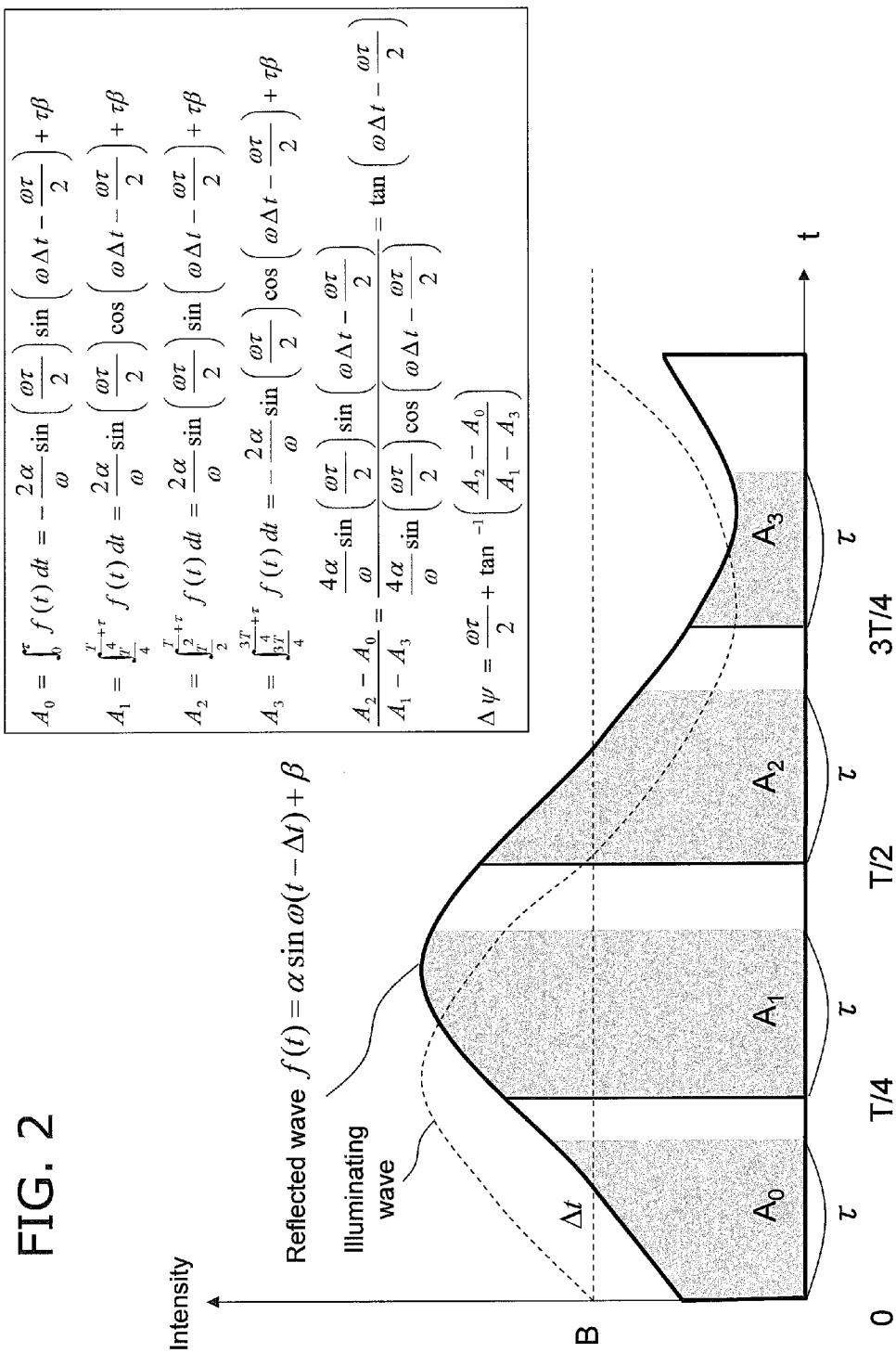
FIG. 2 is a schematic diagram describing the principle of TOF distance measurement (using integration).

REFERENCE SIGNS LIST 1 distance measuring device
10 illumination unit
20 light receiving unit
200 charge accumulation unit
201 light receiving element
202 distribution unit
211A, 211B, 221A, 221B, 231A, 231B accumulation element
210 charge transfer unit
30 distance calculation unit
31 first-wave phase difference calculation unit
32 second-wave phase difference calculation unit
33 third-wave phase difference calculation unit
34 distance value obtaining unit
40 control unit

DESCRIPTION OF EMBODIMENTS

Embodiments of the present invention will now be described with reference to the drawings.

First Embodiment

A distance measuring device 1 according to a first embodiment of the present invention will now be described with reference to FIGS. 3 to 5.

In the first embodiment, triple modulated light (triple wave), which is generated by superimposing (multiplexing) three intensity-modulated light elements having intensities modulated at three different frequencies (a low frequency, an intermediate frequency, and a high frequency), is used as multiple-modulated light (intensity-modulated light generated by superimposing (multiplexing) intensity-modulated light elements having intensities modulated at a plurality of different frequencies). The frequencies of the superimposed (multiplexed) intensity-modulated light elements are selected to satisfy a relationship in which the frequency of one light element is an even multiple of the frequency of another light element. In the simplest example, the frequencies of the intensity-modulated light elements are written as:

Low frequency: $f_1 = f$,
Intermediate frequency: $f_2 = 2*f$, and
High frequency: $f_3 = 4*f$, where f is a reference frequency (having a cycle T) ($f_1$, $f_2$, $f_3$ may hereafter be written as f1, f2, and f3). The frequency (low frequency) of the intensity-modulated light element that has been intensity-modulated at a low frequency is referred to as a frequency f1 (=1). The frequency (intermediate frequency) of the intensity-modulated light element that has been intensity-modulated at an intermediate frequency is referred to as a frequency f2 (=2*f). The frequency (high frequency) of the intensity-modulated light element that has been intensity-modulated at a high frequency is referred to as a frequency f3 (=4*f).

The relationship in which the frequency of one intensity-modulated light element is an even multiple of the frequency of another intensity-modulated light element is written as $$f_{n+1} = 2k_n * f_n (f_{n+1} > f_n, \text{ and } n \text{ and } k_n \text{ are natural numbers})$$

where $f_1, f_2, \ldots$ to $f_n, f_{n+1}$ etc. are the frequencies of the intensity-modulated light elements in the order of lower frequencies.

Although the present embodiment describes the case in which the triple modulated light (triple wave) is used as the multiple modulated light, a double wave (multiple modulated light generated by superimposing (multiplexing) two intensity-modulated light elements having intensities modulated at a low frequency and a high frequency that satisfy the relationship in which the high frequency is an even multiple of the low frequency), may be used. The use of a double wave would sufficiently produce the advantageous effects of the present embodiment (the use of a double wave would enable distance measurement to be performed sufficiently with a higher resolution of the resulting range image, a higher precision of the distance measurement, and a longer measurable distance).

A distance measuring method according to the present embodiment (a distance measuring method implemented by the distance measuring device 1) is also applicable to (can also be used for demultiplexing in) normal cases of distance measurement (in which a multiple wave generated by multiplexing N wave elements is used (where N is a natural number)). The applicability of the distance measurement method to such cases will be described below.

1.1 Structure of the Distance Measuring Device

Figure 3:
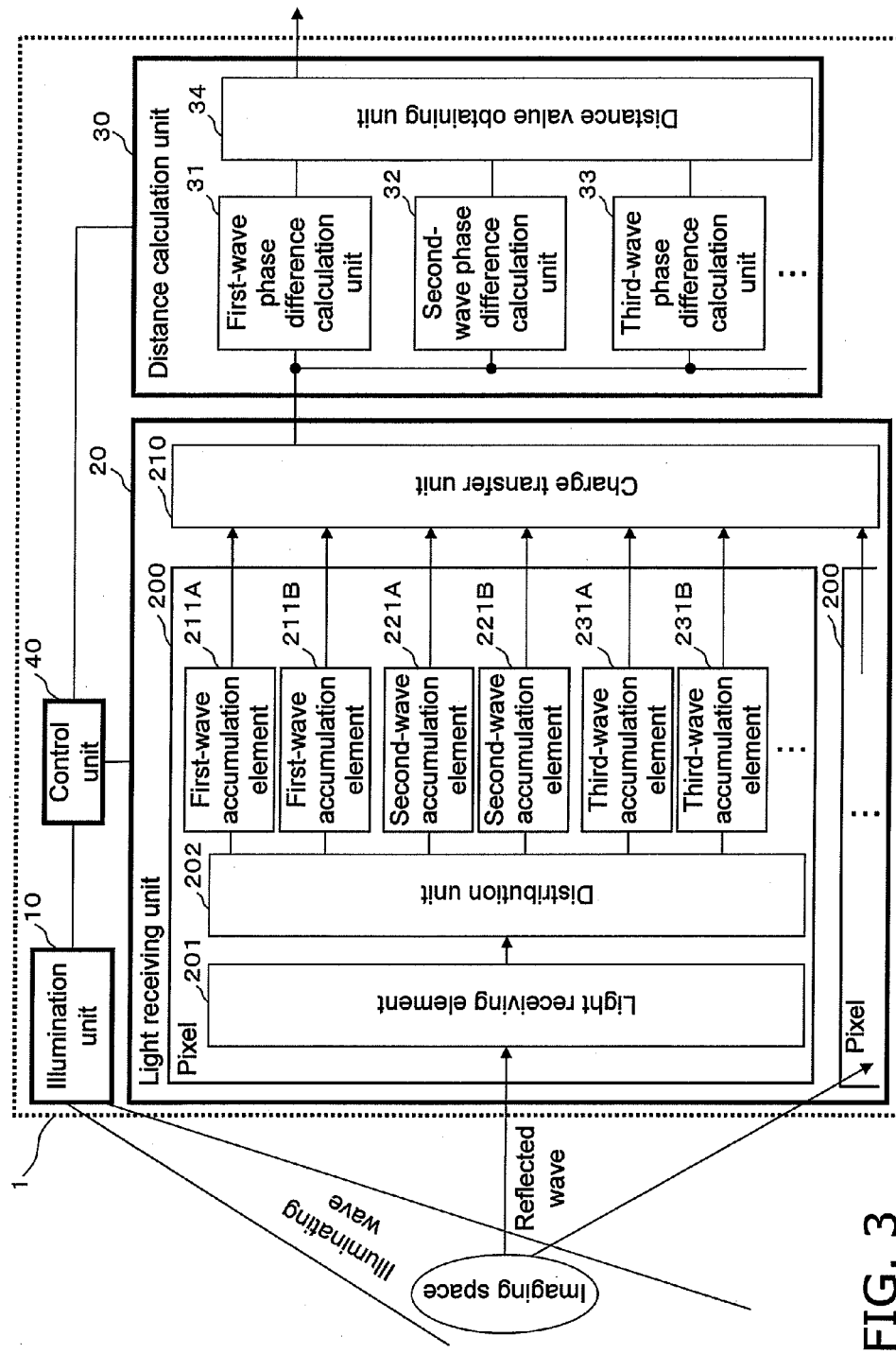
FIG. 3 is a block diagram schematically showing the structure of a distance measuring device 1 according to a first embodiment of the present invention.

FIG. 3 is a block diagram schematically showing the structure of the distance measuring device 1 according to the first embodiment of the present invention.

As shown in FIG. 3, the distance measuring device 1 of the first embodiment includes an illumination unit 10, a light receiving unit 20, a distance calculation unit 30, and a control unit 40. The illumination unit 10 illuminates an imaging space with multiple modulated light. The light receiving unit 20 receives reflected multiple modulated light, which is a reflected wave of the illuminating multiple modulated light from the imaging space. The distance calculation unit 30 calculates a distance between the distance measuring device 1 and an object arranged in the imaging space (a target for distance measurement) based on an output from the light receiving unit 20. The control unit 40 controls the illumination unit 10, the light receiving unit 20, and the distance calculation unit 30.

The illumination unit 10 generates multiple modulated light (triple modulated light (triple wave) by superimposing (multiplexing) three intensity-modulated light elements having intensities modulated at three different frequencies (a low frequency, an intermediate frequency, and a high frequency) in the present embodiment) based on a command from the control unit 40, and illuminates the imaging space, which is a target for distance measurement, with the generated multiple modulated light.

The light receiving unit 20 includes a plurality of charge accumulation units 200 (as many as pixels) (one charge accumulation unit 200 corresponds to one pixel) and a charge transfer unit 210.

Each charge accumulation unit 200, which corresponds to a different pixel, includes a light receiving element 201, a distribution unit 202, first-wave accumulation elements 211A and 211B, second-wave accumulation elements 221A and 221B, and third-wave accumulation units 231A and 231B. Hereafter, the first to N-th wave accumulation elements (N=3 in this example) may be collectively referred to as the accumulation elements.

The light receiving element 201 includes a light receiving element (a light receiving element formed by, for example, a photo diode). The light receiving element 201 receives reflected multiple modulated light (reflected wave) from the imaging space that is the target for distance measurement, and converts the reflected wave to charge (electric signal) through photoelectric conversion. The light receiving element 201 then outputs the charge (electric signal) that has been generated through photoelectric conversion to the accumulation elements (211A, 211B, 221A, 221B, 231A, and 231B) via the distribution unit 202.

The distribution unit 202 executes distribution control as controlled by the control unit 40. At a predetermined timing instructed by the control unit 40, the distribution unit 202 outputs the charge (electric signal) output from the light receiving element 201 selectively to the first-wave charge accumulation elements 211A and 211B, the second-wave charge accumulation elements 221A and 221B, or the third-wave charge accumulation elements 231A and 231B.

The first-wave charge accumulation element 211A includes a charge accumulation element, and accumulates the charge (electric signal) output from the light receiving element 201 via the distribution unit 202. The first-wave accumulation element 211A accumulates charge corresponding to only a low-frequency element of the reflected wave (this will be described in detail later).

The first-wave charge accumulation element 211B includes a charge accumulation element, and accumulates the charge (electric signal) output from the light receiving element 201 via the distribution unit 202. The first-wave accumulation element 211B accumulates charge corresponding to only a low-frequency element of the reflected wave (this will be described in detail later).

The second-wave charge accumulation element 221A includes a charge accumulation element, and accumulates the charge (electric signal) output from the light receiving element 201 via the distribution unit 202. The second-wave accumulation element 221A accumulates charge corresponding to only an intermediate-frequency element of the reflected wave (this will be described in detail later).

The second-wave charge accumulation element 221B includes a charge accumulation element, and accumulates the charge (electric signal) output from the light receiving element 201 via the distribution unit 202. The second-wave accumulation element 221B accumulates charge corresponding to only an intermediate-frequency element of the reflected wave (this will be described in detail later).

The third-wave charge accumulation element 231A includes a charge accumulation element, and accumulates the charge (electric signal) output from the light receiving element 201 via the distribution unit 202. The third-wave accumulation element 231A accumulates charge corresponding to only a high-frequency element of the reflected wave (this will be described in detail later).

The third-wave charge accumulation element 231B includes a charge accumulation element, and accumulates the charge (electric signal) output from the light receiving element 201 via the distribution unit 202. The third-wave accumulation element 231B accumulates charge corresponding to only a high-frequency element of the reflected wave (this will be described in detail later).

The charge accumulation unit 200 uses the multiple modulated light having a multiplicity of 3 (light generated by superimposing (multiplexing) three intensity-modulated light elements having intensities modulated at a low frequency, an intermediate frequency, and a high frequency). Thus, the charge accumulation unit 200 includes accumulation elements for three elements (the accumulation elements 211A and 211B, 221A and 221B, and 231A and 231B). When the multiplicity is N, the charge accumulation unit 200 is only required to include charge accumulation elements for N elements (for example, N*2 accumulation elements).

Figure 4:
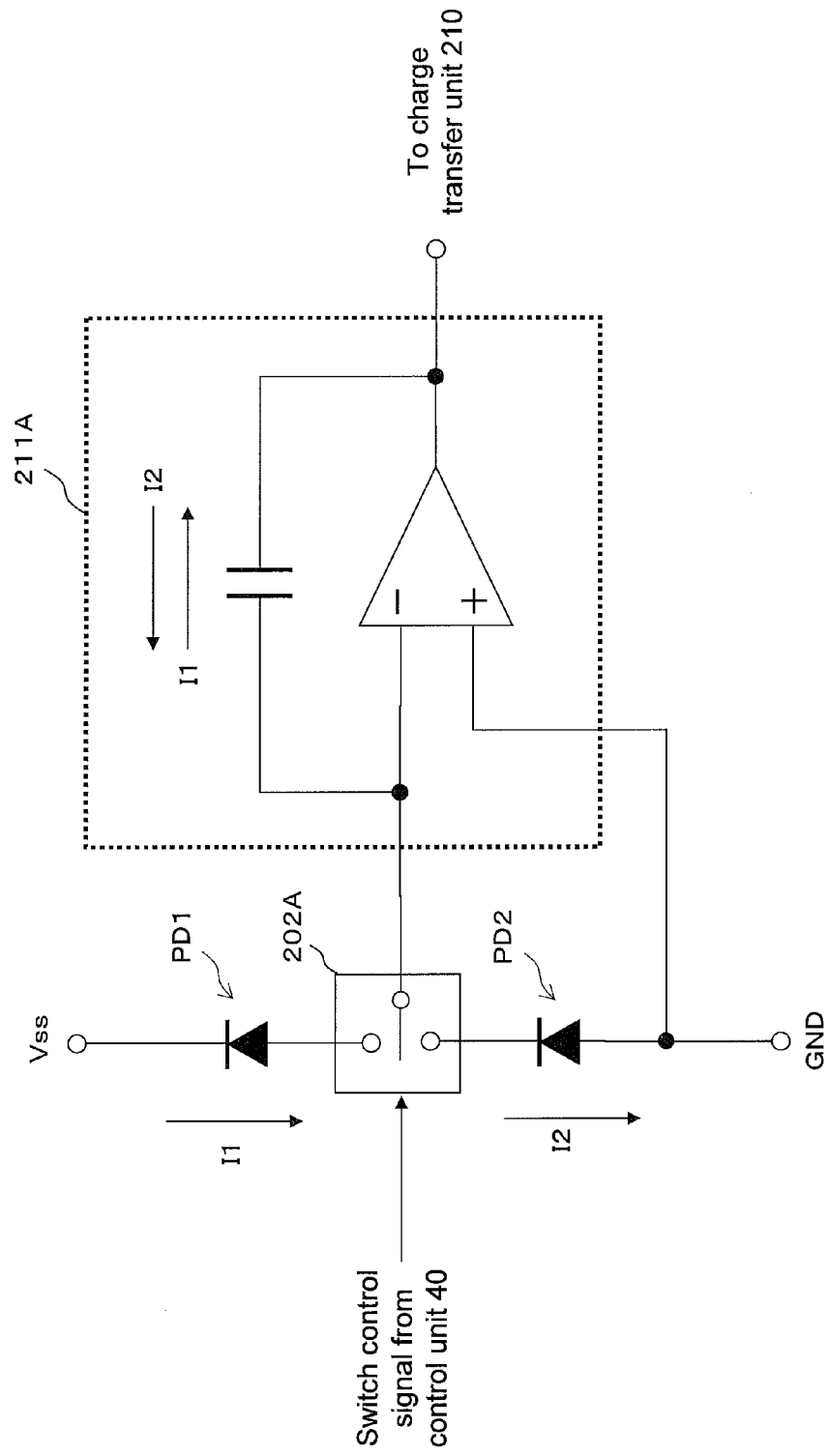
FIG. 4 is a diagram showing an example of the structure (described in FIG. 8 of Patent Citation 3) of a light receiving element 201, a distribution unit 202, and accumulation elements (211A, 211B, 221A, 221B, 231A, and 231B) included in the distance measuring device 1 of the first embodiment.

FIG. 4 shows an example of the structure of the light receiving element 201, the distribution unit 202, and the accumulation elements (211A, 211B, 221A, 221B, 231A, and 231B) (shown in FIG. 8 of Patent Citation 3). As shown in FIG. 4, currents I1 and I2 flowing through photodiodes PD1 and PD2 (constituting a part of the light receiving element 201) flow through the accumulation element (the first-wave accumulation element 211A in FIG. 4) via the distribution unit (partially) 202A. This causes the charge accumulation to be performed. More specifically, the distribution control executed by the distribution unit 202A is switched based on a distribution control signal output from the control unit 40. The switching of the distribution control changes the direction of current flowing through the capacitor included in the accumulation element (the first-wave accumulation element 211A in FIG. 4), and causes charge corresponding to the difference to accumulate in the accumulation element (the first-wave accumulation element 211A in FIG. 4).

The structure shown in FIG. 4 is a mere example. The present invention should not be limited to this structure.

The charge transfer unit 210 receives the accumulated charge (electric signal corresponding to the accumulated charge) output from the accumulation elements (211A, 211B, 221A, 221B, 231A, and 231B) included each charge accumulation unit 200 corresponding to a different pixel. The charge transfer unit 210 transfers the input accumulated charge to the distance calculation unit 30 at a predetermined timing instructed by the control unit 40.

The distance calculation unit 30 receives an output from the charge transfer unit 210 included in the light receiving unit 20, and calculates a distance value corresponding to each pixel based on the accumulated charge (electric signal corresponding to the accumulated charge) corresponding to each pixel output from the charge transfer unit 210, and generates and outputs a range image consisting of pixels having the calculated distance values. The distance calculation unit 30 may calculate distance values using the analogue signals, or may calculate distance values through digital processing using digital signals after converting the analogue signals to the digital signals.

As shown in FIG. 3, the distance calculation unit 30 includes a first-wave phase difference calculation unit 31, a second-wave phase difference calculation unit 32, a third-wave phase difference calculation unit 33, and a distance value obtaining unit 34.

The first-wave phase difference calculation unit 31 receives the accumulated charge (electric signal corresponding to the accumulated charge) corresponding to each pixel output from the charge transfer unit 210, and calculates a low-frequency phase difference based on the accumulated charge (electric signal corresponding to the accumulated charge) corresponding to each pixel output from the charge transfer unit 210. The first-wave phase difference calculation unit 31 outputs the calculated low-frequency phase difference to the distance value obtaining unit 34.

The second-wave phase difference calculation unit 32 receives the accumulated charge (electric signal corresponding to the accumulated charge) corresponding to each pixel output from the charge transfer unit 210, and calculates an intermediate-frequency phase difference based on the accumulated charge (electric signal corresponding to the accumulated charge) corresponding to each pixel output from the charge transfer unit 210. The second-wave phase difference calculation unit 32 outputs the calculated low-frequency phase difference to the distance value obtaining unit 34.

The third-wave phase difference calculation unit 33 receives the accumulated charge (electric signal corresponding to the accumulated charge) corresponding to each pixel output from the charge transfer unit 210, and calculates a high-frequency phase difference based on the accumulated charge (electric signal corresponding to the accumulated charge) corresponding to each pixel output from the charge transfer unit 210. The third-wave phase difference calculation unit 33 outputs the calculated low-frequency phase difference to the distance value obtaining unit 34.

The distance value obtaining unit 34 receives the low-frequency phase difference calculated by the first-wave phase difference calculation unit 31, the intermediate-frequency phase difference calculated by the second-wave phase difference calculation unit 32, and the high-frequency phase difference calculated by the third-wave phase difference calculation unit 33. The distance value obtaining unit 34 then calculates a distance (distance value) corresponding to each pixel based on the low-frequency phase difference, the intermediate-frequency phase difference, and the high-frequency phase difference. The distance value obtaining unit 34 then generates a range image consisting of pixels having the calculated distance values, and outputs the generated range image.

1.2 Operation of the Distance Measuring Device

The operation of the distance measuring device 1 with the above structure will now be described.

The illumination unit 10 illuminates the imaging space, which is a target for distance measurement, with multiple modulated light having frequencies satisfying a relationship in which one frequency is an even multiple of another frequency (for example, a low frequency f1=f, an intermediate frequency f2=2*f, and a high frequency f3=4*f, where f is a reference frequency).

The light receiving unit 20 receives reflected light of the multiple modulated light from the imaging space. More specifically, the light receiving element 201 included in each charge accumulation unit 200 corresponding to a different pixel receives the reflected light of the multiple modulated light from the imaging space. The light receiving unit 20 then performs photoelectric conversion to generate charge corresponding to the amount of light received by the light receiving element 201. The light receiving unit 20 then outputs the generated charge (electric signal) to the distribution unit 202.

The distribution unit 202 then outputs the charge (electric signal) obtained by the light receiving element 201 to the accumulation elements (211A, 211B, 221A, 221B, 231A, and 231B) at predetermined timings while switching the accumulation elements to which the charge is output at each predetermined timing as instructed by the control unit 40.

The accumulation elements (211A, 211B, 221B, 221B, 231A, and 231B) accumulate the charge (electric signal) output from the distribution unit 202.

Figure 5:
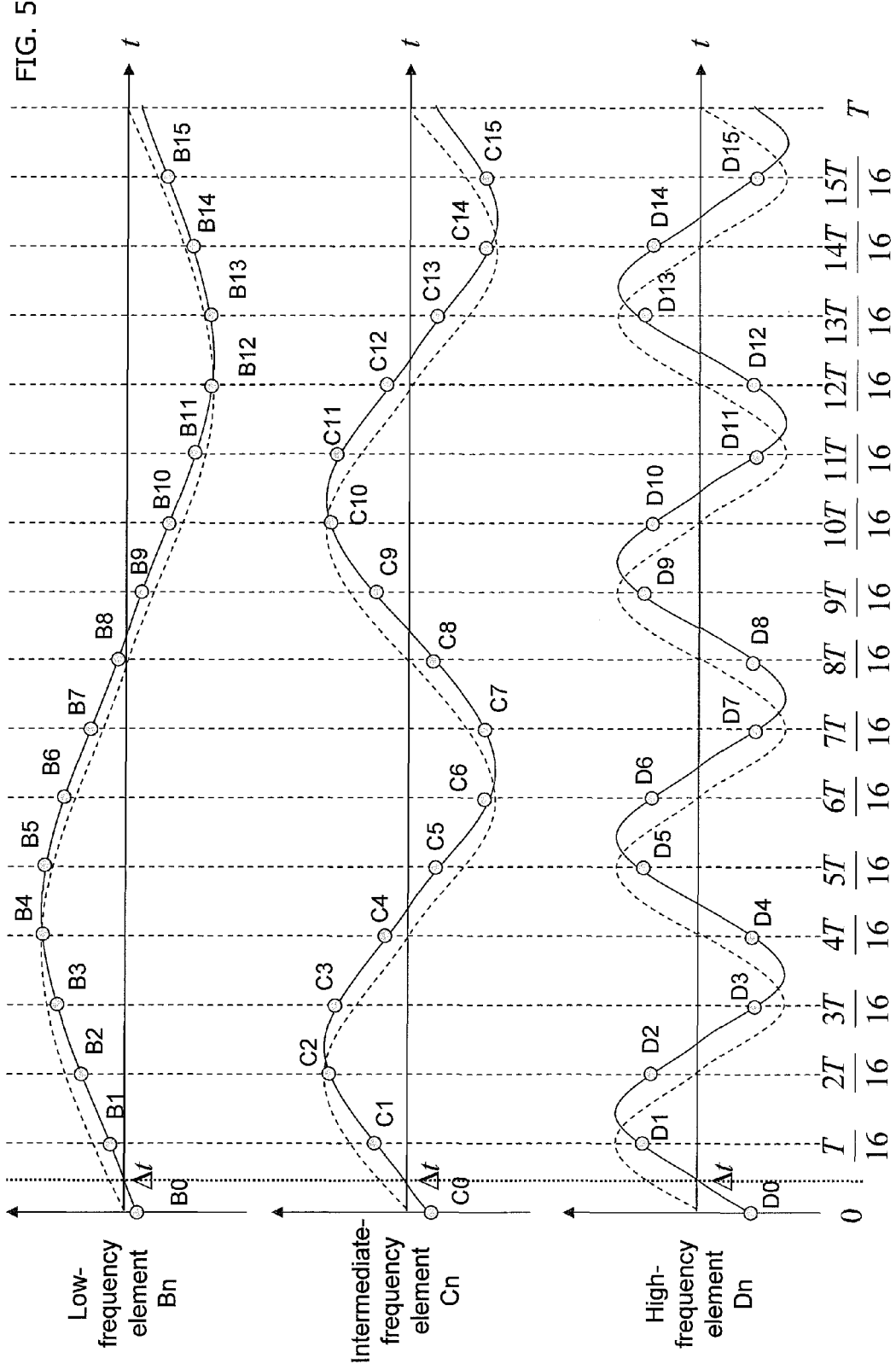
FIG. 5 is a diagram showing the operation of the distance measuring device 1 according to the first embodiment.

The predetermined timing is a timing that occurs at every fourth part of one cycle of the high frequency (T/16) as shown in FIG. 5. When t=jT/16 ($0 \leq j \leq 16$, where j is an integer), a value Aj of a reflected wave f(t) is calculated using the formula below including a low-frequency element Bj, an intermediate-frequency element Cj, a high-frequency element Dj, a variable $\alpha$, and a constant $\beta$:

$$Aj = \alpha(Bj + Cj + Dj) + \beta.$$

The variable $\alpha$ is dependent on the intensity of the light illuminated from the illumination unit 10, the reflectance of an object, the angle of reflection, the type of reflection (specular reflection, diffused reflection, etc.), the distance to an object, and other factors. The constant $\beta$ is dependent on the intensity of the environment light, the reflectance of an object, and other factors.

As the control unit 40 controls the distribution unit 202 to execute distribution control, the first-wave accumulation element 211A accumulates the charge corresponding to $$A8 - A0 = (B8 + C8 + D8) - \alpha(B0 + C0 + D0).$$

More specifically, the first-wave accumulation element 211A accumulates the charge corresponding to a difference between an accumulated charge amount A8 (a sampled value obtained in a predetermined sampling period) at timing t=8 T/16 and an accumulated charge amount A0 (a sampled value obtained in a predetermined sampling period) at timing t=0. The sampling is performed through the distribution control executed by the distribution unit 202.

In the above formula, the constant β (steady-state element) is canceled out by subtraction. The frequency of each of the intermediate-frequency wave and the high-frequency wave is an even multiple of the frequency of the low-frequency wave. Thus, as shown in FIG. 5, the intermediate-frequency element and the high-frequency element each have the same values at the beginning of the cycle of the low-frequency element and at the end of the half cycle of the low-frequency element (C0 and C8 of the intermediate-frequency element, and D0 and D8 of the intermediate-frequency element).

As a result, A8−A0=α(B8−B0). The first-wave accumulation element 211A accumulates the charge corresponding to A8−A0=α (B8−B0). More specifically, the first-wave accumulation element 211A accumulates the charge corresponding only to the low-frequency element.

In the same manner, the first-wave accumulation element 211B accumulates the charge corresponding to $A4-A12=\alpha(B4-B12)$.

More specifically, the first-wave accumulation element 211B accumulates the charge corresponding only to the low-frequency element.

As the control unit 40 controls the distribution unit 202 to execute distribution control, the second-wave accumulation element 221A accumulates the charge corresponding to $(A4-A0)+(A12-A8)$.

More specifically, the second-wave accumulation element 221A continuously accumulates charge for one cycle T of the lowest-frequency f1. The frequency of the high-frequency wave is an even multiple of the frequency of the intermediate-frequency wave. Thus, $D4=D0$ and $D12=D8$.

In this case, the high-frequency element is canceled out by subtraction. The frequency of the intermediate-frequency wave is an even multiple of the frequency of the low-frequency wave. Thus, $B8=-B0$ and $B12=-B4$.

In this case, the low-frequency element is canceled out by addition. Also, $C0=C8$ and $C4=C12$.

As a result, the second-wave accumulation element 221A accumulates the charge corresponding to $(A4-A0)+(A12-A8)=2\alpha(C4-C0)$.

More specifically, the second-wave accumulation element 221A accumulates only the charge corresponding to the intermediate-frequency element.

In the same manner, the second-wave accumulation element 221B accumulates the charge corresponding to $(A2-A6)+(A10-A14)=2\alpha(C2-C6)$.

More specifically, the second-wave accumulation element 221B accumulates only the charge corresponding to the intermediate-frequency element.

As the control unit 40 controls the distribution unit 202 to execute distribution control, the third-wave accumulation element 231A accumulates the charge corresponding to $(A2-A0)+(A6-A4)+(A10-A8)+(A14-A12)$.

More specifically, the third-wave accumulation element 231A continuously accumulates charge for one cycle T of the lowest-frequency f1.
As shown in FIG. 5, $C4=-C0, C6=-C2, C12=-C8, C14=-C10$, $B8=-B0, B10=-B2, B12=-B4, B14=-B6$, $D0=D4=D8=D12$, and $D2=D6=D10=D14$.

Thus, in the same manner, $(A2-A0)+(A6-A4)+(A10-A8)+(A14-A12)=4\alpha(D2-D0)$.

More specifically, the third-wave accumulation element 231A accumulates only the charge corresponding to the high-frequency element.

In the same manner, the third-wave accumulation element 231B accumulates the charge corresponding to $(A1-A3)+(A5-A7)+(A9-A11)+(A13-A15)=4\alpha(D1-D3)$.

More specifically, the third-wave accumulation element 231B accumulates only the charge corresponding to the high-frequency element.

In the manner described above, the distance measuring device 1 performs the demultiplexing process.

Principle of Demultiplexing

The principle of the demultiplexing (the principle of the above demultiplexing process) is applicable to normal cases. The applicability will now be described.

The reflected wave (having a multiplicity N) is written using the formula below:

$$f(t) = \alpha \sum_{i=1}^{N} f_i(t - \Delta t) + \beta \qquad \text{Formula 4}$$

The i-th frequency element (i=1 to N) is written using the formula below:

$$f_i(t) = \sin \omega_i t \qquad \text{Formula 5}$$

To separate the n-th frequency element (1≦n≦N) from the reflected wave f(t), the charge corresponding to a charge difference between the reflected light at timing t=0 and the reflected light at timing $T_n/2$ is summed (a discrete value at every sampling timing is added up) for one cycle of the first frequency (=the lowest frequency) (where $k_n$ is the number of waves). As a result, the above first-wave accumulation element accumulates a first difference summation signal written using the formula below:

$$A_2^{(n)} - A_0^{(n)} = \sum_{j=0}^{k_n-1} \left( f\left(jT_n + \frac{T_n}{2}\right) - f(jT_n) \right) = \qquad \text{Formula 6}$$

$$\alpha \sum_{j=0}^{k_n-1} \sum_{i=1}^{N} \left( f_i\left(jT_n + \frac{T_n}{2} - \Delta t\right) - f_i(jT_n - \Delta t) \right)$$

In this case, the constant β is canceled out by subtraction.

For the i-th frequency element (where i>n), $\omega_i/\omega_n$ is an even number because the frequency of one element is an even multiple of the frequency of another element. Thus, the i-th frequency element is written using the formula below:

$$f_i\left(jT_n + \frac{T_n}{2} - \Delta t\right) = \sin\left(\omega_i(jT_n - \Delta t) + \frac{\omega_i}{\omega_n}\pi\right) \qquad \text{Formula 7}$$
$$= f_i(jT_n - \Delta t)$$

In this case, high-frequency elements exceeding the n-th frequency are all canceled out by subtraction. As a result, the processing corresponding to the formula below is performed:

$$A_2^{(n)} - A_0^{(n)} = \alpha \sum_{j=0}^{k_n-1} \sum_{i=1}^{n} \left(f_i\left(jT_n + \frac{T_n}{2} - \Delta t\right) - f_i(jT_n - \Delta t)\right) \qquad \text{Formula 8}$$

This formula can be transformed into the formula below:

$$A_2^{(n)} - A_0^{(n)} = \qquad \text{Formula 9}$$
$$\alpha \sum_{i=1}^{n}\left(\sum_{j=0}^{k_n-1} f_i\left(jT_n + \frac{T_n}{2} - \Delta t\right) - \sum_{j=0}^{k_n-1} f_i(jT_n - \Delta t)\right)$$

For the i-th frequency element (where i>n), $k_n/k_i$ is an even number because the frequency of one element is an even multiple of the frequency of another element. Thus, the i-th frequency element is written using the formula below:

$$\sum_{j=0}^{k_n-1} f_i(jT_n - \Delta t) = \sum_{j_1=0}^{k_i-1} \sum_{j_2=0}^{\frac{k_n}{k_i}-1} f_i(j_1 T_i + j_2 T_n - \Delta t) \qquad \text{Formula 10}$$
$$= \sum_{j_1=0}^{k_i-1} \sum_{j_3=0}^{\frac{k_n}{2k_i}-1} (f_i(j_1 T_i + j_3 T_n - \Delta t) +$$
$$f_i(j_1 T_i + j_3 T_n - \Delta t)$$

In the same manner as above, the processing corresponding to the formula below is performed:

$$\sum_{j=0}^{k_n-1} f_i\left(jT_n + \frac{T_n}{2} - \Delta t\right) = 0 \qquad \text{Formula 11}$$

In this case, more specifically, low-frequency elements below the n-th frequency are all canceled out by addition.

As a result, the processing corresponding to the formula below is performed:

$$A_2^{(n)} - A_0^{(n)} = \alpha\left(\sum_{j=0}^{k_n-1} f_n\left(jT_n + \frac{T_n}{2} - \Delta t\right) - \right. \qquad \text{Formula 12}$$
$$\left. = \sum_{j=0}^{k_n-1} f_n(jT_n - \Delta t)\right)$$
$$= 2\alpha k_n \sin\omega_n \Delta t$$

Through the processing described above, only the n-th frequency element is separated.

The charge corresponding to a charge difference between the reflected light at timing $t=T_n/4$ and the reflected light at timing $3T_n/4$ is summed (a discrete value at every sampling timing is added up) for one cycle of the first frequency (=the lowest frequency) (where $k_n$ is the number of waves). As a result, the above second-wave accumulation element accumulates a second difference summation signal written using the formula below:

$$A_1^{(n)} - A_3^{(n)} = \sum_{j=0}^{k_n-1} \left(f\left(jT_n + \frac{T_n}{4}\right) - f\left(jT_n + \frac{3T_n}{4}\right)\right) \qquad \text{Formula 13}$$

In the same manner, the processing corresponding to the formula below is performed:

$$A_1^{(n)} - A_3^{(n)} = 2\alpha k_n \cos\omega_n \Delta t \qquad \text{Formula 14}$$

Through the processing above, only the n-th frequency element having a phase that is 90 degrees different from the phase of the above separated frequency is separated.

A phase difference $\Delta\omega_n$ of the n-th frequency element is calculated using the formula below, although this will be described later.

$$\Delta\psi_n = \omega_n \Delta t = \tan^{-1}\left(\frac{A_2^{(n)} - A_0^{(n)}}{A_1^{(n)} - A_3^{(n)}}\right) \qquad \text{Formula 15}$$

Figure 6:
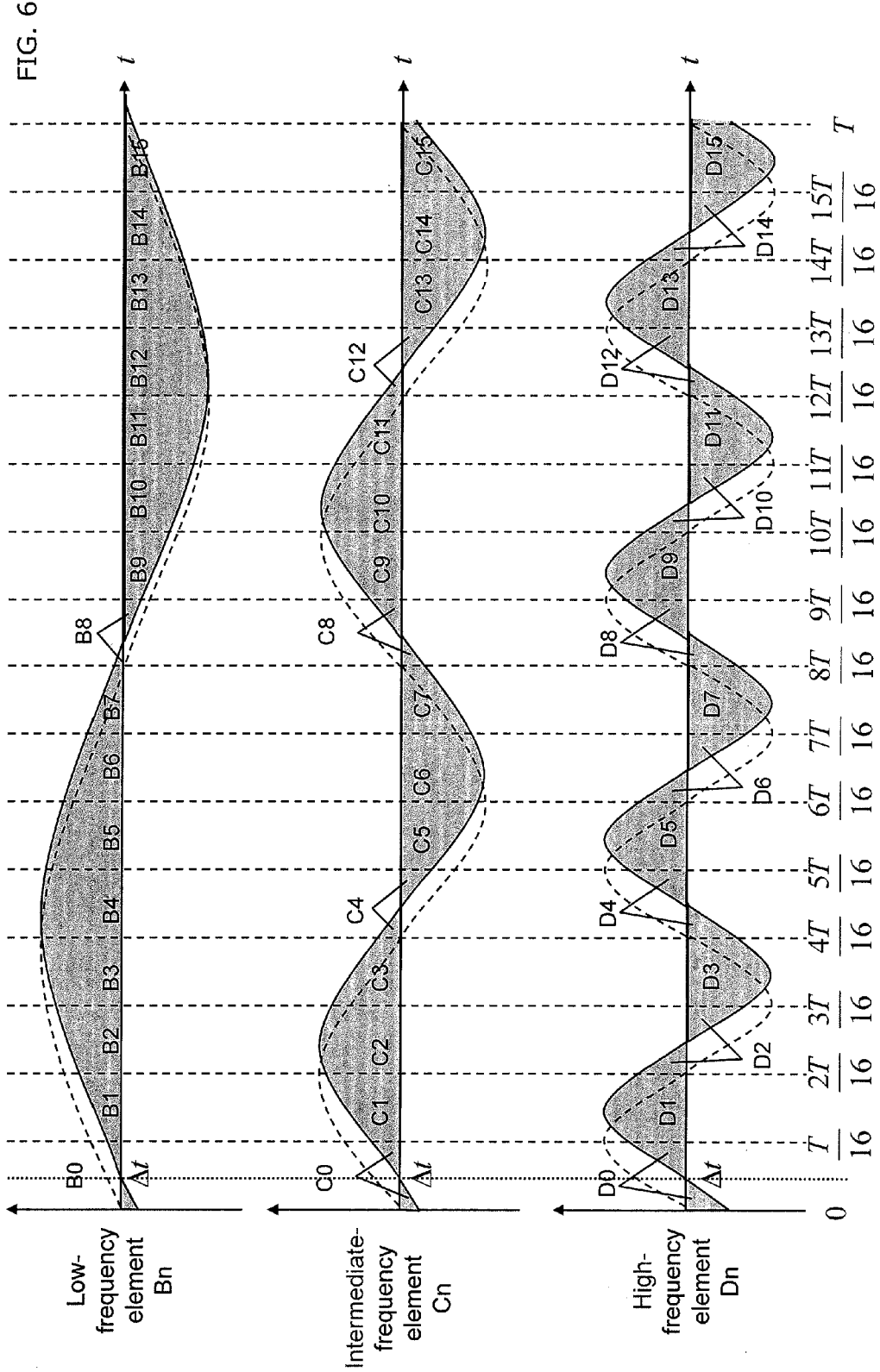
FIG. 6 is a diagram showing the operation of the distance measuring device 1 (using integration) according to the first embodiment.

Alternatively, the distance measuring device 1 may calculate a phase difference using integral values as shown in FIG. 6 instead of using sampled values (used in the above case). When using integral values to calculate a phase difference, the distance measuring device 1 accumulates a larger amount of charge in the accumulation elements, and accordingly improves the S/N ratio (reduces the ratio of noise to the charge amount used for distance measurement). In this case, the distance measuring device 1 performs distance measurement with a higher precision.

When using integral values to calculate a phase difference, the distance measuring device 1 performs the same calculation as described above but using an integral value Aj of the reflected wave f(t) at timing $t=jT_N/4$ to $jT_N/4+\tau(0 \leq 4\omega_N/\omega_1$, where j is an integer) and a low-frequency element Bj, an intermediate-frequency element Cj, and a high-frequency element Dj included in the reflected wave f(t). In the example shown in FIG. 6, N=3, $T_N=T_3=T/4$, and $\omega_N/\omega_1=\omega_3/\omega_1=4$. In this case, the integration is to be performed in a period from $t=jT/T16$ to $t=(j+1)T/16(0 \leq j \leq 16$, where j is an integer).

In this case, a phase difference $\Delta\psi_n$ is calculated using the formula below:

$$\Delta\psi_n = \frac{\omega_n \tau}{2} + \tan^{-1}\left(\frac{A_2^{(n)} - A_0^{(n)}}{A_1^{(n)} - A_3^{(n)}}\right) \qquad \text{Formula 16}$$

The formula additionally includes a term representing an offset of the phase difference $\Delta\psi_n$ (the term $\omega_n\tau/2$ in Formula 16). Although FIG. 6 shows an example in which $\tau=T_n/4$, the phase difference may be calculated using a period other than the period shown in this example. Also, considering a time $\epsilon$ required for switching the distribution control, the phase difference may be calculated using $\tau=T_n/4-\epsilon$.

When the distance measuring device 1 calculates a phase difference using integral values, the control unit 40 may adjust the distribution control over the distribution unit 202 (may adjust the distribution timings and the distribution periods) accordingly so that the accumulation elements (211A, 211B, 221A, 221B, 231A, and 231B) will accumulate the charge corresponding to an integral value obtained for a predetermined period during which the integration is to be performed.

The processing performed by the charge transfer unit 210 and the subsequent processing will now be described.

The charge transfer unit 210 transfers the charge accumulated in the accumulation elements (211A, 211B, 221A, 221B, 231A, and 231B) corresponding to each pixel to the distance calculation unit 30 at a predetermined timing instructed by the control unit 40. The predetermined timing may be any timing at which the charge (electric signal corresponding to the accumulated charge) accumulated in each of the accumulation elements (211A, 211B, 221A, 221B, 231A, and 231B) can be transferred to the distance calculation unit 30 without mixing with the charge accumulated in another accumulation element. For example, the charge (electric signal corresponding to the accumulated charge) that is accumulated in each of the accumulation elements (211A, 211B, 221A, 221B, 231A, and 231B) may be transferred to the distance calculation unit 30 with a transfer method used in, for example, a charge-coupled device (CCD) (a sequential transfer method for example).

The first-wave phase difference calculation unit 31 calculates a low-frequency phase difference corresponding to each pixel based on the accumulated charge amounts for each pixel transferred from the charge transfer unit 210.

More specifically, based on an accumulated charge amount a (B8-B0) of the first-wave accumulation element 211A and an accumulated charge amount a (B4-B12) of the first-wave accumulation element 211B, which are transferred from the charge transfer unit 210, the first-wave phase difference calculation unit 31 calculates a low-frequency phase difference $\Delta\psi 1$ using the formula below:

$$\Delta\psi_1 = \tan^{-1}\left(\frac{B_8 - B_0}{B_4 - B_{12}}\right) \qquad \text{Formula 17}$$

The second-wave phase difference calculation unit 32 calculates an intermediate-frequency phase difference corresponding to each pixel based on accumulated charge amounts for each pixel transferred from the charge transfer unit 210.

More specifically, based on an accumulated charge amount $2\alpha$ (C4-C0) of the second-wave accumulation element 221A and an accumulated charge amount $2\alpha$ (C2-C6) of the second-wave accumulation element 221B, which are transferred from the charge transfer unit 210, the second-wave phase difference calculation unit 32 calculates a low-frequency phase difference $\Delta\omega 2$ using the formula below:

$$\Delta\psi_2 = \tan^{-1}\left(\frac{C_4 - C_0}{C_2 - C_6}\right) \qquad \text{Formula 18}$$

The third-wave phase difference calculation unit 33 calculates a high-frequency phase difference corresponding to each pixel based on the accumulated charge amounts for each pixel transferred from the charge transfer unit 210.

More specifically, based on an accumulated charge $4\alpha$ (D2-D0) of the third-wave accumulation element 231A and an accumulated charge $4\alpha$ (D1-D3) of the third-wave accumulation element 231B, which are transferred from the charge transfer unit 210, the third-wave phase difference calculation unit 33 calculates a high-frequency phase difference $\Delta\psi 3$ using the formula below:

$$\Delta\psi_3 = \tan^{-1}\left(\frac{D_2 - D_0}{D_1 - D_3}\right) \qquad \text{Formula 19}$$

The distance value obtaining unit 34 calculates a distance (distance value) corresponding to each pixel based on the three phase differences: the low-frequency phase difference calculated by the first-wave phase difference calculation unit 31, the intermediate-frequency phase difference calculated by the second-wave phase difference calculation unit 32, and the high-frequency phase difference calculated by the third-wave phase difference calculation unit 33.

More specifically, the distance value obtaining unit 34 determines an ultimate phase difference $\Delta\psi$ for each pixel based on the low-frequency phase difference $\Delta\psi 1$, the intermediate-frequency phase difference $\Delta\psi 2$, and the high-frequency phase difference $\Delta\psi 3$, and calculates a distance value L for each pixel based on the ultimate phase difference $\Delta\psi$.

For example, the distance value obtaining unit 34 calculates the ultimate phase difference $\Delta\psi$ using the formula below based on the low-frequency phase difference $\Delta\psi 1$ and the high-frequency phase difference $\Delta\psi 3$:

$$\Delta\psi = \left\lfloor \frac{f_3 \Delta\psi_1}{f_1 \pi} + 0.5 \right\rfloor \pi + \Delta\psi_3 \qquad \text{Formula 20}$$

When $\Delta\psi 1 \leq \Delta\psi 2 \leq \pi/2$, the distance value obtaining unit 34 calculates the ultimate phase difference $\Delta\psi$ using the formula below:

$$\Delta\psi = \left\lfloor \frac{f_3 \Delta\psi_2}{f_2 \pi} + 0.5 \right\rfloor \pi + \Delta\psi_3 \qquad \text{Formula 21}$$

More specifically, the distance value obtaining unit 34 calculates the ultimate phase difference $\Delta\psi$ using, instead of the low-frequency phase difference, the intermediate-frequency phase difference having a higher precision than the low-frequency phase difference when the intermediate-frequency phase difference is equal to or below $\pi/2$ (the lowest detectable phase difference).

Also, the quotient diverges and the high-frequency phase difference $\Delta\psi 3$ has a low reliability when the denominator of the term included in formula below is small:

$$\Delta\psi_3 = \tan^{-1}\left(\frac{D_2 - D_0}{D_1 - D_3}\right) \qquad \text{Formula 22}$$

In this case, the distance value obtaining unit 34 calculates the ultimate phase difference using the formula below (using, for example, $f_i$=f1 and $f_j$=f3).

$$\Delta\psi = \frac{f_j}{f_i}\Delta\psi_i \qquad \text{Formula 23}$$

More specifically, the distance value obtaining unit 34 calculates the distance based only on the low-frequency phase difference to avoid such cases in which distance measurement is impossible.

Based on on the ultimate phase difference $\Delta\psi$ calculated in the manner described above, the distance value obtaining unit 34 calculates the distance value L for each pixel using the formula below:

$$L = \frac{c\Delta\psi}{4\pi f_3} \qquad \text{Formula 24}$$

where c is the speed of light.

Based on Formulas 20 to 24, the distance measuring device 1 can measure distances within a maximum measurable distance range that is determined by the low-frequency wave f1 with a high precision that is determined by the high frequency f3.

The distance value obtaining unit 34 obtains the distance value L for each pixel through the processing described above, and generates a range image consisting of pixels having the obtained (calculated) distance values L and outputs the generated range image.

As described above, the distance measuring device 1 of the present embodiment, which uses multiple modulated light generated by multiplexing a plurality of light elements having frequencies satisfying a relationship in which the frequency of one element is an even multiple of the frequency of another element, can demultiplex the modulated light simply through the distribution control. Also, the distance measuring device 1 continuously accumulates the charge corresponding to a charge difference, and thus enables the steady-state elements (such as the environment light) to be constantly canceled out by subtraction and prevents the charge accumulated in the accumulation elements from reaching saturation. As a result, the distance measuring device 1 illuminates the imaging space (object), which is a target for distance measurement, with modulated light in a more reliable manner, and performs distance measurement at a higher precision.

The distance measuring device 1 and the distance measuring method of the present embodiment significantly reduce the circuit scale required for demultiplexing circuitry, and enable distance measurement to be performed with a higher resolution of the resulting range image, a higher precision of the distance measurement, and a longer measurable distance.

In the above example, the multiple modulated light has a multiplicity of 3 (a low frequency, an intermediate frequency, and a high frequency). In this case, the distance calculation unit 30 includes three functional units for calculating a phase difference: the first-wave phase difference calculation unit 31, the second-wave phase difference calculation unit 32, and the third-wave phase difference calculation unit 33. When the multiple modulated light has a multiplicity of N, the distance calculation unit 30 is only required to include functional units for phase difference calculation corresponding to the multiplicity, and the same method as described above is to be applied to the case in which the multiple modulated light has a multiplicity of N. This enables the distance measuring device and the distance measuring method of the present embodiment to be usable when the multiple modulated light has a multiplicity of N.

Modification

A modification of the present embodiment will now be described. Although the above embodiment describes the case in which the phase difference is calculated using the charge difference stored in the device, the phase difference may be calculated in the manner described below. The accumulation elements may first accumulate charge without changing the charge value (without changing the sign of the charge value), and then the accumulated charge may be output to the phase difference calculation units (the first-wave phase difference calculation unit 31, the second-wave phase difference calculation unit 32, and the third-wave phase difference calculation unit 33 in the first embodiment) via the charge transfer unit 210. The phase difference calculation unit may then perform subtraction to calculate the phase difference. This modification eliminates the need for a current inversion circuit that is used in the accumulation elements to obtain the charge difference.

More specifically, the charge of the reflected light at timing t=0 is summed for one cycle (where $k_n$ is the number of waves) of the first frequency (=the lowest frequency). In other words, the first accumulation element accumulates the charge corresponding to the $0^{th}$ summation signal written using the formula below:

$$A_0^{(n)} = \sum_{j=0}^{k_n-1} f(jT_n) \qquad \text{Formula 25}$$

The second accumulation element accumulates the charge corresponding to the $2^{nd}$ summation signal written using the formula below:

$$A_2^{(n)} = \sum_{j=0}^{k_n-1} f\left(jT_n + \frac{T_n}{2}\right) \qquad \text{Formula 26}$$

After the charge accumulated in the first accumulation element and the charge accumulated in the second accumulation element are transferred, the first accumulation element accumulates the first summation signal written using the formula below:

$$A_1^{(n)} = \sum_{j=0}^{k_n-1} f\left(jT_n + \frac{T_n}{4}\right) \qquad \text{Formula 27}$$

The second accumulation element accumulates the third summation signal written using the formula below:

$$A_3^{(n)} = \sum_{j=0}^{k_n-1} f\left(jT_n + \frac{3T_n}{4}\right) \qquad \text{Formula 28}$$

The phase difference calculation unit then performs the subtraction corresponding to the formula below:

$$A_2^{(n)} - A_0^{(n)} = \sum_{j=0}^{k_n-1} \left( f\left(jT_n + \frac{T_n}{2}\right) - f(jT_n) \right) \quad \text{Formula 29}$$

Through this processing, the phase difference calculation unit extracts a frequency element with no phase difference from each frequency element.

The phase difference calculation unit also performs the subtraction corresponding to the formula below:

$$A_1^{(n)} - A_3^{(n)} = \sum_{j=0}^{k_n-1} \left( f\left(jT_n + \frac{T_n}{4}\right) - f\left(jT_n + \frac{3T_n}{4}\right) \right) \quad \text{Formula 30}$$

Through this processing, the phase difference calculation unit extracts a frequency element having a phase that is 90 degrees different from each frequency element.

The phase difference calculation unit then calculates a phase difference corresponding to each frequency element based on the frequency element with no phase difference from each frequency element and the frequency element having a phase that is 90 degrees different from each frequency element.

The distance measuring device then calculates the ultimate phase difference $\Delta\psi$ with the same method as described in the above embodiment, and calculates the distance value L for each pixel based on the calculated ultimate phase difference $\Delta\psi$.

In this modification, the distance measuring device may calculate the distance value L for each pixel using integral values as described with reference to FIG. 6 in the above embodiment, instead of using the sampled values as described in the above processing. When the integral values are used instead of the sampled values to calculate the phase difference $\Delta\psi$, the calculation is less likely to be affected by noise.

As described above, the present modification eliminates the need for a current inversion circuit, and enables the distance measuring device to have a smaller pixel pitch and reduces a decrease in the resolution of a range image formed by the distance measuring device.

The distance measuring device and the distance measuring method of the present modification significantly reduce the circuit scale required for demultiplexing circuitry, and enable distance measurement to be performed with a higher resolution of the resulting range image, a higher precision of the distance measurement, and a longer measurable distance.

Other Embodiments

Although the distance measuring device of the above embodiment performs distance measurement using a multiple wave (multiple modulated light), the present invention should not be limited to this structure. For example, an object that is a target for distance measurement (the imaging space) may be illuminated repeatedly (in a time-multiplexed manner) by alternately using a plurality of intensity-modulated light elements having intensities modulated at different frequencies. Alternatively, the distance measurement may be performed using intensity-modulated light generated by continuously switching the frequencies of light using a chirp signal. For example, the frequencies of light may be scanned in the order of lower frequencies using a chirp signal, and the frequency for intensity modulation may be set around the maximum frequency with which a phase difference corresponding to each of all pixels does not exceed $\pi/2$. In this manner, the frequency for intensity modulation can be set to consider the most distant point in the target space for distance measurement.

Alternatively, the distance measurement may be performed using polarized light (polarized wave) in which a low-frequency element and a high-frequency element are perpendicular to each other. For example, the reflected wave may be split at the light receiving side using a half mirror into elements traveling along two paths, and a low-frequency element and a high-frequency element may be extracted from the reflected wave using a polarization filter. A phase difference corresponding to each frequency may then be calculated using the extracted elements.

When a plurality of objects arranged in the imaging space, which is a target for distance measurement, have greatly varying distances from the distance measuring device, the distance measurement may be performed using intensity-modulated light having a longer wavelength (having a lower frequency) for a more distant object. In one example, an object A may be distant from the device and an object B may be near the device. In this case, the distance measuring device may generate multiple modulated light (the lowest frequency of the intensity-modulated light elements to be multiplexed is referred to as the "frequency fA") using intensity-modulated light having a longer wavelength (light modulated at a lower frequency) (this intensity-modulated light is referred to as the "intensity-modulated light A" and the frequency of the intensity-modulated light A is referred to as the "frequency fA") for the object A, and illuminate the object A with the generated multiple modulated light and measure the distance to the object A with the above distance measuring method. The distance measuring device may generate multiple-modulated light (the lowest frequency of the intensity-modulated light elements to be multiplexed is referred to as the "frequency fB") using intensity-modulated light B having a shorter wavelength than the intensity-modulated light A (the frequency of the intensity-modulated light B is referred to as the "frequency fB") for the object B, and illuminate the object B with the generated multiple modulated light and measure the distance to the object B with the above distance measuring method. The distance measuring device may perform the distance measurement in this manner.

Each block of the distance measuring device described in the above embodiment may be formed using a single chip with a semiconductor device, such as LSI (large-scale integration), or some or all of the blocks of the distance measuring device may be formed using a single chip.

Although LSI is used as the semiconductor device technology, the technology may be IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks. Biotechnology is potentially applicable.

The processes described in the above embodiment may be realized using either hardware or software, or may be realized using both software and hardware. When the distance measuring device of the above embodiment is implemented by hardware, the distance measuring device requires timing adjustment for each of their processes. For ease of explanation, timing adjustment associated with various signals required in an actual hardware design is not described in detail in the above embodiment.

The specific structures described in the above embodiment are mere examples of the present invention, and may be changed and modified variously without departing from the scope and spirit of the invention.

Industrial Applicability

The distance measuring device (in particular the range image sensor), the distance measuring device, the program, and the integrated circuit of the present invention, which enable measurement of long distances with a high resolution and with a high precision, are useful in diversified fields including imaging (3D images, arbitrary focused images, object detection and recognition, and 3D measurement), robot eyes, traffic safety (collision detection), security, factory automation, and game interfaces, and are implementable in these fields.

The invention claimed is:

1. A distance measuring device, comprising:
an illumination unit operable to illuminate a target for distance measurement with multiple modulated light that is intensity-modulated using a multiplex modulation signal generated by multiplexing N different frequencies $f_n$, where N is an integer equal to or greater than 2, and $1 \leq n \leq N$, the frequencies $f_n$ satisfying a relationship in which $f_{n+1} = 2k_n * f_n$, where n and $k_n$ are natural numbers, and $k_n$ is a constant indicating the relationship between the frequencies $f_n$ and $f_{n+1}$;
a light receiving unit operable to receive reflected light of the illuminating multiple modulated light from the distance measurement target, and obtain charge corresponding to an amount of the received light;
a distribution unit operable to output the charge obtained by the light receiving unit to a predetermined output destination at a predetermined timing;
an accumulation unit operable to accumulate the charge output from the distribution unit; and
a distance calculation unit operable to calculate a distance to the distance measurement target based on an amount of charge accumulated by the accumulation unit.

2. The distance measuring device according to claim 1, wherein
the accumulation unit includes at least one accumulation element for each frequency $f_n$ included in the multiple modulated light, where $1 \leq n \leq N$.

3. The distance measuring device according to claim 1, wherein
the distribution unit switches, for each frequency $f_n$ included in the multiple modulated light, where $1 \leq n \leq N$ and the frequency has a cycle $T_n$, the output destination at a predetermined timing t0, a predetermined timing t1 that is different from the timing t0, or t1≠t0, a predetermined timing t2 that is $T_n/2$ later than the timing t0, or t2=t0+$T_n/2$, and a predetermined timing t3 that is $T_n/2$ later than the timing t0, or t3=t1+$T_n/2$, and
the accumulation unit continuously accumulates charge for at least a longest cycle $T_1$ of the multiple modulated light.

4. The distance measuring device according to claim 3, wherein
the accumulation unit accumulates a charge amount corresponding to a difference between a charge amount at the timing t0 and a charge amount at the timing t2 for at least the longest cycle $T_1$ and generates a first difference summation signal, and
after transferring the accumulated charge amount to the distance calculation unit, the accumulation unit accumulates a charge amount corresponding to a difference between a charge amount at the timing t1 and a charge amount at the timing t3 for at least the longest cycle $T_1$ and generates a second difference summation signal.

5. The distance measuring device according to claim 3, wherein
the accumulation unit includes a first accumulation unit and a second accumulation unit, and
the first accumulation unit accumulates the charge amount corresponding to the difference between the charge amount at the timing t0 and the charge amount at the timing t2 for at least the longest cycle $T_1$ and generates the first difference summation signal, and
the second accumulation unit accumulates the charge amount corresponding to the difference between the charge amount at the timing t1 and the charge amount at the timing t3 for at least the longest cycle $T_1$ and generates the second difference summation signal.

6. The distance measuring device according to claim 4, wherein
the accumulation unit accumulates, as the first difference summation signal, charge corresponding to the formula below:

$$A_2^{(n)} - A_0^{(n)} = \sum_{j=0}^{k_n-1} \left( f\left(jT_n + \frac{T_n}{2}\right) - f(jT_n) \right),$$

and
the accumulation unit accumulates, as the second difference summation signal, charge corresponding to the formula below:

$$A_1^{(n)} - A_3^{(n)} = \sum_{j=0}^{k_n-1} \left( f\left(jT_n + \frac{T_n}{4}\right) - f\left(jT_n + \frac{3T_n}{4}\right) \right),$$

where $A_0$ is an accumulated charge amount at the timing t0, $A_1$ is an accumulated charge amount at the timing t1, $A_2$ is an accumulated charge amount at the timing t2, $A_3$ is an accumulated charge amount at the timing t3, f( ) is the reflected light of the multiple modulated light from the distance measurement target, $T_n$ is a cycle of an n-th frequency element included in the multiple modulated light, where n is a natural number and $1 \leq n \leq N$, and $k_n$ is the number of waves included in the longest cycle $T_1$, or $k_n = f_n/f_1$.

7. The distance measuring device according to claim 3, wherein
the accumulation unit transfers, as the $0^{th}$ to third summation signals, the charge amounts corresponding to the timings t0 to t3 to the distance calculation unit by sequentially performing, for an accumulated charge amount corresponding to the timing t0, an accumulated charge amount corresponding to the timing t1, an accumulated charge amount corresponding to the timing t2, and an accumulated charge amount corresponding to the timing t3, processing of accumulating, at selected one of the timings t0 to t3, a charge amount corresponding to the selected timing for at least the longest cycle $T_1$ and transferring the accumulated charge amount to the distance calculation unit.

8. The distance measuring device according to claim 3, wherein the accumulation unit includes a first accumulation unit and a second accumulation unit, and the first accumulation unit and the second accumulation unit transfer, as the $0^{th}$ to third summation signals, the charge amounts corresponding to the timings t0 to t3 by accumulating charge amounts at selected two of the timings t0 to t3 for at least the longest cycle $T_1$, and then transferring the accumulated charge amounts to the distance calculation unit, and after transferring the accumulated charge amounts to the distance calculation unit, accumulating charge amounts corresponding to the remaining two of the timings for at least the longest cycle $T_1$, and then transferring the accumulated charge amounts to the distance calculation unit.

9. The distance measuring device according to claim 3, wherein the accumulation unit includes a $0^{th}$ accumulation unit, a first accumulation unit, a second accumulation unit, and a third accumulation unit, and for at least the longest cycle $T_1$, the $0^{th}$ accumulation unit accumulates a charge amount at the timing t0 and generates a $0^{th}$ summation signal, the first accumulation unit accumulates a charge amount at the timing t1 and generates a first summation signal, the second accumulation unit accumulates a charge amount at the timing t2 and generates a second summation signal, and the third accumulation unit accumulates a charge amount at the timing t3 and generates a third summation signal.

10. The distance measuring device according to claim 7, wherein the accumulation unit accumulates, as the $0^{th}$ summation signal, charge corresponding to the formula below:

$$A_0^{(n)} = \sum_{j=0}^{k_n-1} f(jT_n),$$

the accumulation unit accumulates, as the first summation signal, charge corresponding to the formula below:

$$A_1^{(n)} = \sum_{j=0}^{k_n-1} f\left(jT_n + \frac{T_n}{4}\right),$$

the accumulation unit accumulates, as the second summation signal, charge corresponding to the formula below:

$$A_2^{(n)} = \sum_{j=0}^{k_n-1} f\left(jT_n + \frac{T_n}{2}\right),$$

and the accumulation unit accumulates, as the third summation signal, charge corresponding to the formula below:

$$A_3^{(n)} = \sum_{j=0}^{k_n-1} f\left(jT_n = \frac{3T_n}{4}\right),$$

where $A_0$ is an accumulated charge amount at the timing t0, $A_1$ is an accumulated charge amount at the timing t1, $A_2$ is an accumulated charge amount at the timing t2, $A_3$ is an accumulated charge amount at the timing t3, f( ) is the reflected light of the multiple modulated light from the distance measurement target, $T_n$ is a cycle of an n-th frequency element included in the multiple modulated light, where n is a natural number and $1 \leq n \leq N$, and $k_n$ is the number of waves included in the longest cycle $T_1$ or $k_n = f_n/f_1$.

11. The distance measuring device according to claim 1, wherein the distance calculation unit calculates a phase difference amount of each frequency included in the multiple modulated light, and calculates an ultimate phase difference amount based on, among the calculated phase difference amounts, a low-frequency phase difference amount that is a phase difference amount of selected one of the frequency elements included in the multiple modulated light, a high-frequency phase difference amount that is a phase difference amount of a higher frequency element than a frequency element corresponding to the low-frequency phase difference amount in the frequency elements included in the multiple modulated light, and calculates the distance based on the calculated ultimate phase difference amount.

12. The distance measuring device according to claim 11, wherein the distance calculation unit calculates a phase difference amount $\Delta\psi_n$ of each frequency included in the multiple modulated light, the ultimate phase difference amount $\Delta\psi$, and the distance L based on the formulas below:

$$\Delta\psi_n = \tan^{-1}\left(\frac{A_2^{(n)} - A_0^{(n)}}{A_1^{(n)} - A_3^{(n)}}\right),$$

$$\Delta\psi = \left\lfloor \frac{f_j \Delta\psi_i}{f_i \pi} + 0.5 \right\rfloor \pi + \Delta\psi_j, \text{ and}$$

$$L = \frac{c\Delta\psi}{4\pi f_j},$$

where $\Delta\psi_i$ is the low-frequency phase difference amount of a frequency $f_i$, $\Delta\psi_j$ is the high-frequency phase difference amount of a frequency $f_j$, $A_0$ is an accumulated charge amount at the timing t0, $A_1$ is an accumulated charge amount at the timing t1, $A_2$ is an accumulated charge amount at the timing t2, $A_3$ is an accumulated charge amount at the timing t3, f( ), and c is a speed of light.

13. The distance measuring device according to claim 12, wherein the distance calculation unit calculates the phase difference amount $\Delta\psi_n$ of each frequency included in the multiple modulated light using the formula below:

$$\Delta\psi_n = \frac{\omega_n \tau}{2} + \tan^{-1}\left(\frac{A_2^{(n)} - A_0^{(n)}}{A_1^{(n)} - A_3^{(n)}}\right),$$

considering a charge accumulation time τ at each of the timings, where $A_0$ is an accumulated charge amount at the timing t0, $A_1$ is an accumulated charge amount at the timing t1, $A_2$ is an accumulated charge amount at the timing t2, $A_3$ is an accumulated charge amount at the timing t3, and ω is an angular frequency.

14. The distance measuring device according to claim 11, wherein
the distance calculation unit calculates a phase difference amount $\psi_{k-1}$ as the low-frequency phase difference amount when the phase difference amount $\psi_n$ of each frequency included in the multiple modulated light is arranged in an ascending order of numerical subscripts, where n=1, 2, ..., and k is a numerical subscript used to identify a phase difference amount that first reaches π/2 or more, where 2≦k≦N.

15. The distance measuring device according to claim 11, wherein
when an absolute value of the first difference summation signal is small or when an absolute value of a difference between the first summation signal and the third summation signal is small,
the distance calculation unit uses, as the ultimate phase difference amount, the phase difference amount calculated using the formula below:

$$\Delta\psi = \frac{f_j}{f_i}\Delta\psi_i$$

where $\Delta\psi_i$ is the low-frequency phase difference amount of a frequency $f_i$.

16. The distance measuring device according to claim 1, wherein
the illumination unit generates the multiple modulated light in a manner that a lower-frequency element included in the multiple modulated light has a smaller amplitude.

17. A distance measuring method used in a distance measuring device including an illumination unit operable to illuminate a target for distance measurement with multiple modulated light that is intensity-modulated using a multiplex modulation signal generated by multiplexing N different frequencies $f_n$, where N is an integer equal to or greater than 2, and 1≦n≦N, the frequencies $f_n$ satisfying a relationship in which $f_{n+1}=2k_n*f_n$, where n and $k_n$ are natural numbers, and $k_n$ is a constant indicating the relationship between the frequencies $f_n$ and $f_{n+1}$; a light receiving unit operable to receive reflected light of the illuminating multiple modulated light from the distance measurement target, and obtain charge corresponding to an amount of the received light; a distribution unit operable to output the charge obtained by the light receiving unit to a predetermined output destination at a predetermined timing; and an accumulation unit operable to accumulate the charge output from the distribution unit, the accumulation unit including a first accumulation unit and a second accumulation unit,
the method comprising:
controlling to switch an output destination of the distribution unit to a predetermined output destination at a predetermined timing; and
calculating a distance to the distance measurement target based on an amount of charge accumulated by the first accumulation unit and the second accumulation unit.

18. A non-transitory storage medium storing a computer-readable program enabling a computer to implement a distance measuring method used in a distance measuring device including an illumination unit operable to illuminate a target for distance measurement with multiple modulated light that is intensity-modulated using a multiplex modulation signal generated by multiplexing N different frequencies $f_n$, where N is an integer equal to or greater than 2, and 1≦n≦N, the frequencies $f_n$ satisfying a relationship in which $f_{n+1}=2k_n*f_n$, where n and $k_n$ are natural numbers, and $k_n$ is a constant indicating the relationship between the frequencies $f_n$ and $f_{n+1}$; a light receiving unit operable to receive reflected light of the illuminating multiple modulated light from the distance measurement target, and obtain charge corresponding to an amount of the received light; a distribution unit operable to output the charge obtained by the light receiving unit to a predetermined output destination at a predetermined timing; and an accumulation unit operable to accumulate the charge output from the distribution unit, the accumulation unit including a first accumulation unit and a second accumulation unit,
the method comprising:
controlling to switch an output destination of the distribution unit to a predetermined output destination at a predetermined timing; and
calculating a distance to the distance measurement target based on an amount of charge accumulated by the first accumulation unit and the second accumulation unit.

19. An integrated circuit, comprising:
an illumination unit operable to illuminate a target for distance measurement with multiple modulated light that is intensity-modulated using a multiplex modulation signal generated by multiplexing N different frequencies $f_n$, where N is an integer equal to or greater than 2, and 1≦n≦N, the frequencies $f_n$ satisfying a relationship in which $f_{n+1}=2k_n*f_n$, where n and $k_n$ are natural numbers, and $k_n$ is a constant indicating the relationship between the frequencies $f_n$ and $f_{n+1}$;
a light receiving unit operable to receive reflected light of the illuminating multiple modulated light from the distance measurement target, and obtain charge corresponding to an amount of the received light;
a distribution unit operable to output the charge obtained by the light receiving unit to a predetermined output destination at a predetermined timing;
an accumulation unit operable to accumulate the charge output from the distribution unit; and
a distance calculation unit operable to calculate a distance to the distance measurement target based on an amount of charge accumulated by the accumulation unit.

* * * * *